(12) United States Patent
Opshaug et al.

(10) Patent No.: US 11,191,054 B2
(45) Date of Patent: Nov. 30, 2021

(54) METHOD AND APPARATUS FOR ESTIMATING A POSITION OF A MOBILE DEVICE USING BUNDLED POSITIONING REFERENCE SIGNALS

(71) Applicant: QUALCOMM Incorporated, San Diego, CA (US)

(72) Inventors: Guttorm Ringstad Opshaug, Redwood City, CA (US); Saravanan Suresh Kumar, Fremont, CA (US); Tae Min Kim, San Diego, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 16/661,388

(22) Filed: Oct. 23, 2019

(65) Prior Publication Data

US 2020/0145955 A1     May 7, 2020

Related U.S. Application Data

(60) Provisional application No. 62/755,330, filed on Nov. 2, 2018.

(51) Int. Cl.
*H04W 24/00* (2009.01)
*H04W 64/00* (2009.01)
(Continued)

(52) U.S. Cl.
CPC ........... *H04W 64/00* (2013.01); *H04L 5/0048* (2013.01); *H04W 24/08* (2013.01)

(58) Field of Classification Search
CPC ......... H04W 4/20; H04W 4/30; H04W 4/021; H04M 2242/00; H04M 2203/20
See application file for complete search history.

(56) References Cited

U.S. PATENT DOCUMENTS 9,615,214 B2 * 4/2017 Syrjarinne .............. H04W 4/02
9,797,983 B1   10/2017 Bitra et al.
(Continued)

OTHER PUBLICATIONS

Fischer S., "Observed Time Difference of Arrival (OTDOA) Positioning in 3GPP LTE", Qualcomm Technologies Inc, Jun. 6, 2014 (Jun. 6, 2014), pp. 1-62, XP055284784, Retrieved from the Internet: URL: http://www.terranautx.com/s/Qualcomm-OTDOA-positioning-in-LTE-June-2014.pdf, p. 9, chapter 3.1;p. 13, chapter 4.2.1;p. 15, chapter 5.1;p. 18, chapter 5.4;pp. 31-33, chapter 6.3;pp. 37-39, chapter 6.5; pp. 40-42, chapters 7.1.1-7.1.3.

*Primary Examiner* — Amancio Gonzalez
(74) *Attorney, Agent, or Firm* — Qualcomm Incorporated

(57) ABSTRACT

An entity, such as a mobile device or base station, measures downlink position referencing signals (PRS) occasions or uplink position sounding referencing signal occasions for supporting estimating the position of the mobile device. The entity, for example, performs a plurality of positioning measurements from a plurality of consecutive PRS occasions received in a bundle from one or more base stations or from a mobile device. Each PRS occasion may include one or more slots and may be narrowband or non-narrowband. The bundled, e.g., consecutive, PRS occasions may be transmitted with a periodicity that is sufficient to maintain a desired throughput. Moreover, with the use of bundled PRS occasions, power consumption of the mobile device, as well as effects of clock drift and mobile device movement, may be minimized.

40 Claims, 17 Drawing Sheets

(51) Int. Cl.
 *H04W 24/08* (2009.01)
 *H04L 5/00* (2006.01)

(56) References Cited

U.S. PATENT DOCUMENTS

| | | | | |
|---|---|---|---|---|
| 10,341,807 B2* | 7/2019 | Frenger | ............... | H04W 64/00 |
| 2004/0008138 A1* | 1/2004 | Hockley, Jr. | ........... | G01S 19/51 |
| | | | | 342/357.48 |
| 2004/0017312 A1* | 1/2004 | Anderson | ............... | G01S 5/02 |
| | | | | 342/457 |
| 2004/0160360 A1* | 8/2004 | Jung | ................. | G01S 19/254 |
| | | | | 342/357.29 |
| 2004/0185865 A1* | 9/2004 | Maanoja | ............ | H04W 64/00 |
| | | | | 455/452.2 |
| 2007/0121545 A1* | 5/2007 | Park | ...................... | G01S 5/18 |
| | | | | 370/329 |
| 2007/0280167 A1* | 12/2007 | Olexa | ................ | H04W 52/04 |
| | | | | 370/331 |
| 2009/0156228 A1* | 6/2009 | Mia | ..................... | G01S 5/0221 |
| | | | | 455/456.1 |
| 2011/0176523 A1* | 7/2011 | Huang | ................... | G01S 5/02 |
| | | | | 370/338 |
| 2011/0244891 A1* | 10/2011 | Ghinamo | ............. | G01S 19/40 |
| | | | | 455/456.6 |
| 2011/0291885 A1* | 12/2011 | Marshall | ........... | G01S 5/0236 |
| | | | | 342/357.42 |
| 2012/0072110 A1* | 3/2012 | Venkatraman | ...... | G01S 5/0252 |
| | | | | 701/434 |
| 2012/0289243 A1* | 11/2012 | Tarlow | ................ | G01S 5/0072 |
| | | | | 455/456.1 |
| 2013/0196682 A1* | 8/2013 | Kristoffersen | ....... | G01S 5/0236 |
| | | | | 455/456.1 |
| 2013/0316740 A1* | 11/2013 | Scarafia | ............... | H04W 4/029 |
| | | | | 455/456.5 |
| 2014/0003262 A1* | 1/2014 | He | ........................ | H04W 4/70 |
| | | | | 370/252 |
| 2014/0059695 A1* | 2/2014 | Parecki | ............... | H04L 63/102 |
| | | | | 726/26 |
| 2014/0171097 A1* | 6/2014 | Fischer | ............... | G01S 5/0242 |
| | | | | 455/456.1 |
| 2014/0171126 A1* | 6/2014 | Mayor | ................ | H04W 4/023 |
| | | | | 455/456.6 |
| 2015/0011233 A1* | 1/2015 | Kazmi | ............... | H04W 72/044 |
| | | | | 455/454 |
| 2015/0296475 A1* | 10/2015 | Burroughs | ........... | H04W 56/00 |
| | | | | 455/456.1 |
| 2016/0157225 A1* | 6/2016 | Joshi | ................... | H04W 4/029 |
| | | | | 370/329 |
| 2016/0205499 A1* | 7/2016 | Davydov | ............... | G01S 19/05 |
| | | | | 455/456.1 |
| 2016/0212579 A1* | 7/2016 | Duan | .................... | H04W 4/023 |
| 2017/0238298 A1* | 8/2017 | Wang | ............... | H04W 72/1268 |
| | | | | 455/452.1 |
| 2017/0366244 A1* | 12/2017 | Lee | ....................... | H04B 7/0619 |
| 2017/0374638 A1* | 12/2017 | Han | ...................... | H04W 64/00 |
| 2018/0054796 A1* | 2/2018 | Edge | .................. | H04W 64/003 |
| 2018/0063818 A1* | 3/2018 | Chen | .................. | H04W 72/042 |

* cited by examiner

METHOD AND APPARATUS FOR ESTIMATING A POSITION OF A MOBILE DEVICE USING BUNDLED POSITIONING REFERENCE SIGNALS

CROSS-REFERENCE TO RELATED APPLICATIONS

This application claims the benefit of U.S. Provisional Application No. 62/755,330, entitled "METHOD AND APPARATUS FOR TRACKING MOBILE DEVICES USING BUNDLED POSITIONING REFERENCE SIGNALS," filed Nov. 2, 2018, which is assigned to the assignee hereof and which is expressly incorporated herein by reference in its entirety.

BACKGROUND

Field

The subject matter disclosed herein relates to wireless communications systems, and more particularly to methods and apparatuses for position location of a mobile device.

Relevant Background

It is often desirable to know the location of a mobile device such as a cellular phone, or other wireless communication device. For example, a location services (LCS) client may desire to know the location of a mobile device in the case of an emergency services call or to provide some service to the user of the mobile device such as navigation assistance, direction finding, or asset tracking. The terms "location", "location estimate", "position", "position estimate" and "position fix" are synonymous and are used interchangeably herein.

SUMMARY

An entity, such as a mobile device or base station, measures downlink position referencing signals (PRS) occasions or uplink position sounding referencing signal occasions for supporting estimating the position of the mobile device. The entity, for example, performs a plurality of positioning measurements from a plurality of consecutive PRS occasions received in a bundle from one or more base stations or from a mobile device. Each PRS occasion may include one or more slots and may be narrowband or non-narrowband. The bundled, e.g., consecutive, PRS occasions may be transmitted with a periodicity that is sufficient to maintain a desired throughput. Moreover, with the use of bundled PRS occasions, power consumption of the mobile device, as well as effects of clock drift and mobile device movement, may be minimized.

In one implementation, a method of supporting estimating a position of a mobile device performed by the mobile device includes receiving a first bundle of a plurality of position referencing signal occasions from one or more base stations, wherein each position referencing signal occasion comprises one or more slots; determining positioning measurements based on the plurality of position referencing signal occasions from the first bundle for determining a first position estimate; and receiving a second bundle of a plurality of position referencing signal occasions from the one or more base stations, wherein the first bundle and the second bundle are separated in time by more slots than a number of slots in the first bundle and no position referencing signal occasions are transmitted by the one or more base stations between the first bundle and the second bundle.

In one implementation, a mobile device capable of supporting estimating a position of the mobile device includes a wireless transceiver configured to wirelessly communicate with a wireless network and to receive signals transmitted from one or more base stations; at least one memory; and at least one processor coupled to the wireless transceiver and the at least one memory, the at least one processor configured to: receive a first bundle of a plurality of position referencing signals occasions via the wireless transceiver from the one or more base stations, wherein each position referencing signal occasion comprises one or more slots; determine positioning measurements based on the plurality of position referencing signal occasions from the first bundle for determining a first position estimate; and receive a second bundle of a plurality of position referencing signal occasions from the one or more base stations, wherein the first bundle and the second bundle are separated in time by more slots than a number of slots in the first bundle and no position referencing signal occasions are transmitted by the one or more base stations between the first bundle and the second bundle.

In one implementation, a mobile device capable of supporting estimating a position of the mobile device, includes means for receiving a first bundle of a plurality of position referencing signal occasions from one or more base stations, wherein each position referencing signal occasion comprises one or more slots; means for determining positioning measurements based on the plurality of position referencing signal occasions from the first bundle for determining a first position estimate; and means for receiving a second bundle of a plurality of position referencing signal occasions from the one or more base stations, wherein the first bundle and the second bundle are separated in time by more slots than a number of slots in the first bundle and no position referencing signal occasions are transmitted by the one or more base stations between the first bundle and the second bundle.

In one implementation, a non-transitory computer readable medium including program code stored thereon, the program code is operable to configure at least one processor in a mobile device capable of supporting estimating a position of the mobile device, includes program code to receive a first bundle of a plurality of position referencing signal occasions from one or more base stations, wherein each position referencing signal occasion comprises one or more slots; program code to determine positioning measurements based on the plurality of position referencing signal occasions from the first bundle for determining a first position estimate; and program code to receive a second bundle of a plurality of position referencing signal occasions from the one or more base stations, wherein the first bundle and the second bundle are separated in time by more slots than a number of slots in the first bundle and no position referencing signal occasions are transmitted by the one or more base stations between the first bundle and the second bundle.

In one implementation, a method of transmitting bundled position referencing signal signals by a base station for supporting estimating a position of a mobile device, includes transmitting a first bundle of position referencing signal occasions, wherein each position referencing signal occasion comprises one or more slots; transmitting one or more slots of non-position referencing signal occasions; and transmitting a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle.

In one implementation, a base station capable of transmitting bundled position referencing signal signals for supporting estimating a position of a mobile device, includes a wireless transmitter configured to wirelessly communicate with the mobile device; at least one memory; and at least one processor coupled to the wireless transmitter and the at least one memory, the at least one processor configured to: transmit a first bundle of position referencing signal occasions, wherein each position referencing signal occasion comprises one or more slots; transmit one or more slots of non-position referencing signal occasions; and transmit a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle.

In one implementation, a base station capable of transmitting bundled position referencing signal signals for supporting estimating a position of a mobile device, includes means for transmitting a first bundle of position referencing signal occasions, wherein each position referencing signal occasion comprises one or more slots; means for transmitting one or more slots of non-position referencing signal occasions; and means for transmitting a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle.

In one implementation, a non-transitory computer readable medium including program code stored thereon, the program code is operable to configure at least one processor in a base station capable of transmitting bundled position referencing signal signals for supporting estimating a position of a mobile device, includes program code to transmit a first bundle of position referencing signal occasions, wherein each position referencing signal occasion comprises one or more slots; program code to transmit one or more slots of non-position referencing signal occasions; and program code to transmit a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle.

In one implementation, a method supporting estimating a position of a mobile device performed by a base station, includes receiving a first bundle of a plurality of position sounding referencing signal occasions from the mobile device, wherein each position sounding referencing signal occasion comprises one or more slots; transmitting to an entity location information based on the plurality of position sounding referencing signal occasions from the first bundle for determining a first position estimate, wherein the entity comprises a location server or the mobile device; and receiving a second bundle of a plurality of position sounding referencing signal occasions from the mobile device, wherein the first bundle and the second bundle are separated in time by more slots than a number of slots in the first bundle and no position sounding referencing signal occasions are transmitted by the mobile device between the first bundle and the second bundle.

In one implementation, a base station supporting estimating a position of a mobile device, includes a wireless transmitter configured to wirelessly communicate with the mobile device; at least one memory; and at least one processor coupled to the wireless transmitter and the at least one memory, the at least one processor configured to: receive a first bundle of a plurality of position sounding referencing signal occasions from the mobile device, wherein each position sounding referencing signal occasion comprises one or more slots; transmit to an entity location information based on the plurality of position sounding referencing signal occasions from the first bundle for determining a first position estimate, wherein the entity comprises a location server or the mobile device; and receive a second bundle of a plurality of position sounding referencing signal occasions from the mobile device, wherein the first bundle and the second bundle are separated in time by more slots than a number of slots in the first bundle and no position sounding referencing signal occasions are transmitted by the mobile device between the first bundle and the second bundle.

In one implementation, a base station supporting estimating a position of a mobile device, includes means for receiving a first bundle of a plurality of position sounding referencing signal occasions from the mobile device, wherein each position sounding referencing signal occasion comprises one or more slots; means for transmitting to an entity location information based on the plurality of position sounding referencing signal occasions from the first bundle for determining a first position estimate, wherein the entity comprises a location server or the mobile device; and means for receiving a second bundle of a plurality of position sounding referencing signal occasions from the mobile device, wherein the first bundle and the second bundle are separated in time by more slots than a number of slots in the first bundle and no position sounding referencing signal occasions are transmitted by the mobile device between the first bundle and the second bundle.

In one implementation, a non-transitory computer readable medium including program code stored thereon, the program code is operable to configure at least one processor in a base station capable of supporting estimating a position of a mobile device, includes program code to receive a first bundle of a plurality of position sounding referencing signal occasions from the mobile device, wherein each position sounding referencing signal occasion comprises one or more slots; program code to transmit to an entity location information based on the plurality of position sounding referencing signal occasions from the first bundle for determining a first position estimate, wherein the entity comprises a location server or the mobile device; and program code to receive a second bundle of a plurality of position sounding referencing signal occasions from the mobile device, wherein the first bundle and the second bundle are separated in time by more slots than a number of slots in the first bundle and no position sounding referencing signal occasions are transmitted by the mobile device between the first bundle and the second bundle.

In one implementation, a method of transmitting bundled position sounding referencing signal signals by a mobile device for supporting estimating a position of the mobile device, includes transmitting a first bundle of position sounding referencing signal occasions, wherein each position sounding referencing signal occasion comprises one or more slots; delaying transmission of position sounding referencing signal occasions; and transmitting a second bundle of position sounding referencing signal occasions, wherein each position sounding referencing signal occasion comprises one or more slots, wherein delaying the transmission of position sounding referencing signal occasions is performed between transmission of the first bundle and the second bundle and no position sounding referencing signal occasions are transmitted between the first bundle and the second bundle.

In one implementation, a mobile device capable of transmitting bundled position sounding referencing signal signals for supporting estimating a position of the mobile device, includes a wireless transceiver configured to wirelessly communicate with a wireless network and to receive signals transmitted from one or more base stations; at least one memory; and at least one processor coupled to the wireless transceiver and the at least one memory, the at least one processor configured to: transmit a first bundle of position sounding referencing signal occasions, wherein each position sounding referencing signal occasion comprises one or more slots; delay transmission of position sounding referencing signal occasions; and transmit a second bundle of position sounding referencing signal occasions, wherein each position sounding referencing signal occasion comprises one or more slots, wherein delaying the transmission of position sounding referencing signal occasions is performed between transmission of the first bundle and the second bundle and no position sounding referencing signal occasions are transmitted between the first bundle and the second bundle.

In one implementation, a mobile device capable of transmitting bundled position sounding referencing signal signals for supporting estimating a position of the mobile device, includes means for transmitting a first bundle of position sounding referencing signal occasions, wherein each position sounding referencing signal occasion comprises one or more slots; means for delaying transmission of position sounding referencing signal occasions; and means for transmitting a second bundle of position sounding referencing signal occasions, wherein each position sounding referencing signal occasion comprises one or more slots, wherein delaying the transmission of position sounding referencing signal occasions is performed between transmission of the first bundle and the second bundle and no position sounding referencing signal occasions are transmitted between the first bundle and the second bundle.

In one implementation, a non-transitory computer readable medium including program code stored thereon, the program code is operable to configure at least one processor in a mobile device capable of transmitting bundled position sounding referencing signal signals for supporting estimating a position of the mobile device, includes program code to transmit a first bundle of position sounding referencing signal occasions, wherein each position sounding referencing signal occasion comprises one or more slots; program code to delay transmission of position sounding referencing signal occasions; and program code to transmit a second bundle of position sounding referencing signal occasions, wherein each position sounding referencing signal occasion comprises one or more slots, wherein delaying the transmission of position sounding referencing signal occasions is performed between transmission of the first bundle and the second bundle and no position sounding referencing signal occasions are transmitted between the first bundle and the second bundle.

Figure 1:
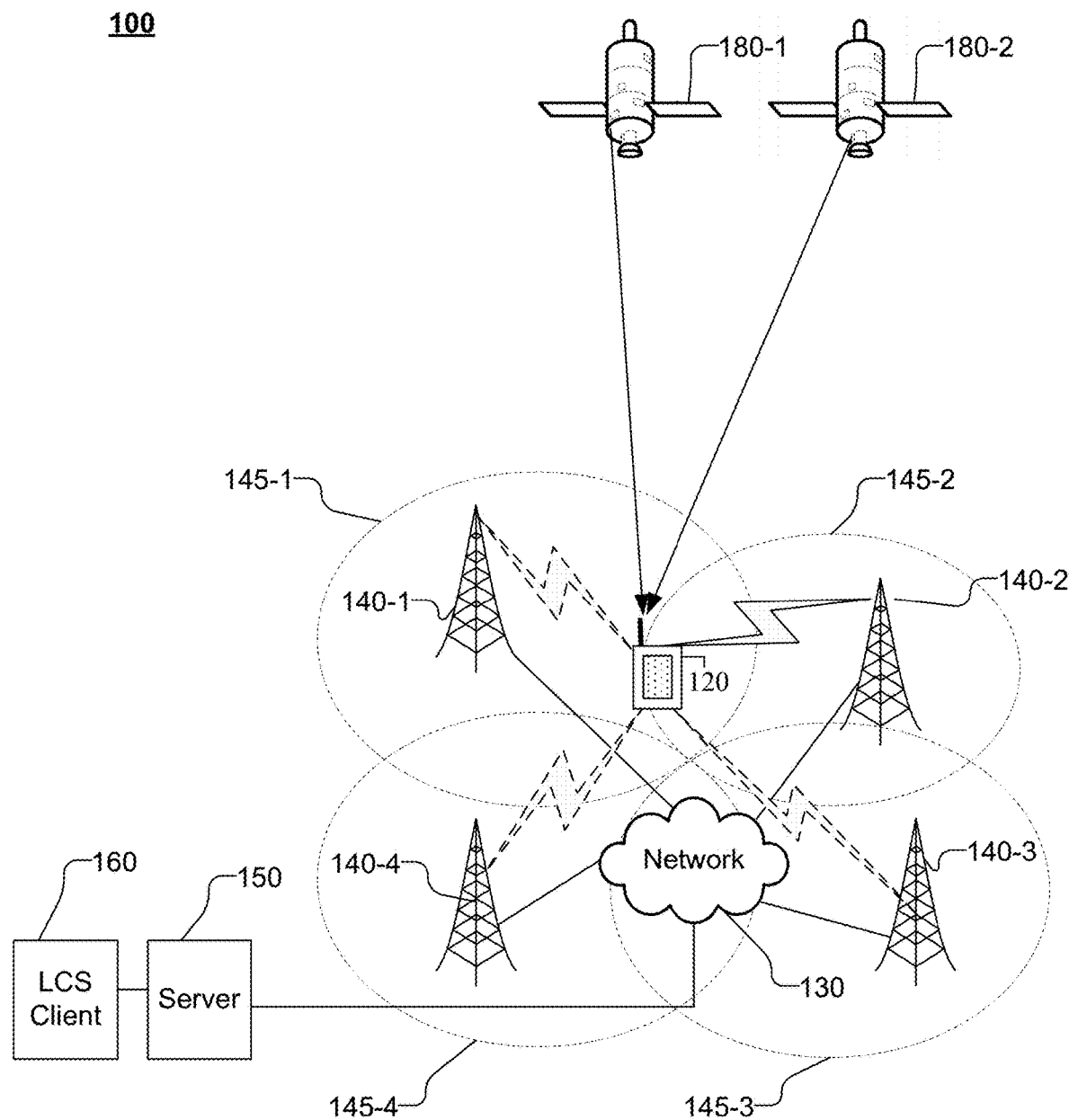
FIG. 1 shows an architecture of an exemplary system capable of providing location services to a mobile device.

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element. For example, FIG. 1 contains four distinct network cells, labelled 145-1, 145-2, 145-3 and 145-4. A reference to a cell 140 then corresponds to any of the cells 145-1, 145-2, 145-3 and 145-4.

DETAILED DESCRIPTION

The terms "mobile device", "mobile stations" (MS), "user equipment" (UE) and "target" are used interchangeably herein and may refer to a device such as a cellular or other wireless communication device, personal communication system (PCS) device, personal navigation device (PND), Personal Information Manager (PIM), Personal Digital Assistant (PDA), laptop, smartphone, tablet or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile device" or "target" are intended to include all devices, including wireless and wireline communication devices, computers, laptops, etc., which are capable of communication with a server, such as via the Internet, WiFi, cellular wireless network, Digital Subscriber Line (DSL) network, packet cable network or other network, and regardless of whether satellite signal reception, assistance data reception, and/or position-related processing occurs at the device, at a server, or at another device associated with the network. Any operable combination of the above are also considered a "mobile device."

Observed Time Difference of Arrival (OTDOA) is a position method defined by the 3rd Generation Partnership Project (3GPP) in 3GPP Technical Specification (TS) 36.355 and 3GPP TS 36.211. OTDOA relies on measuring Reference Signal Time Differences (RSTDs) between downlink (DL) signals received from a base station, such as an evolved Node B (eNodeB), for a reference cell and base station(s), e.g., eNodeB(s), for one or more neighbor cells. The DL signals for which RSTDs may be obtained comprise a Cell-specific Reference Signal (CRS) and a Positioning Reference Signal (PRS)—e.g. as defined in 3GPP TS 36.211.

Other positioning methods may use reference signals transmitted by or received by base stations. While the present disclosure may be detailed with reference to a single positioning method for brevity, it should be understood that present disclosure is applicable to multiple positioning methods, including downlink based positioning methods, uplink based positioning methods and downlink and uplink based positioning methods. For example, other positioning methods include, e.g., downlink based positioning methods such as DL Time Difference of Arrival (DL-TDOA), DL Angle of Departure (DL AoD), Enhanced Cell ID (ECID); uplink based positioning methods, e.g., UL Time Difference of Arrival (UL-TDOA), UL Angle of Arrival (UL AoA), UL Relative Time of Arrival (UL-RTOA); and downlink and uplink based positioning methods, e.g., Round-trip time (RTT) with one or more neighboring base stations.

The more narrowband that a PRS deployment is for positioning methods, such as OTDOA, the longer the required occasion length (i.e., the number of sub-frames) for operations at a constant carrier to interference plus noise ratio (CINR) level. For example, narrowband internet of things (NB-IoT) has conformance test requirements for occasions lasting 320 sub-frames. There are only a few options for the periodicity of PRS and narrowband PRS (NPRS), e.g., periodicity may be {5,10,20,40,80,160,320, 640,1280} ms. Accordingly, use of longer occasion lengths will have a significant impact on network throughput. Furthermore, OTDOA requires the use of contiguous clocks in order to relate measurements from different occasions, so power consumption of the mobile device may largely be similar within and outside a PRS/NPRS occasion. It is desirable to limit the impact on network throughput while at the same time minimizing mobile device power consumption.

One problem with a conventional OTDOA approach using NPRS is that an increased number of subframes will be required for each positioning occasion. For example, the number of subframes per positioning occasion may be 320, while the maximum period for NPRS is 1280 ms. Accordingly, deploying NPRS with these parameters will have a large impact on network throughput (25%), which may prevent the deployment of NPRS in the first place. A reduction of the occasion duration to 80 ms would reduce the throughput overhead to 6.25%, which is still an order of magnitude higher than overhead for conventional PRS deployments. From a positioning standpoint, increasing the NPRS-Period while keeping the number of occasions per positioning session fixed, would result in lengthening the session duration. Lengthening the session duration, however, is not desirable because the measurements would now be impacted more by mobile device clock drift and mobile device motion. Further, power consumption would increase significantly because contiguous clocks are required throughout the duration of the location session.

Additionally, in some non-narrowband implementations of PRS deployment for OTDOA, or an equivalent reference signal (e.g. Tracking Reference Signal, Channel State Indicator Reference signal, Primary Synchronization Signal, Secondary Synchronization Signal, and yet-to-be-defined PRS-like signal in Release 16 of 3GPP specification, and a similar measurement method to be used in a 5G New Radio (NR) network, it may be desirable to improve the accuracy of positions estimates for a target device. For example, in applications where a high degree of accuracy is desired and the mobile device is moving, an unacceptably large error may occur due to motion. By way of example, if PRS signals are spaced 160 ms apart, and two occasions are required for generating a position fix, and the mobile device is moving at 30 m/s, there may be an error of approximately 5 m due to motion of the mobile device.

As discussed herein, the above-described problems may be resolved by transmitting PRS signals bundled together, e.g., a number of PRS occasions are transmitted close in time or consecutively. As used herein, unless otherwise indicated, the term "PRS" may signify both regular PRS and NPRS. Moreover, while the terms "PRS" and "NPRS" are terms used in LTE technology and have not been officially adopted in 5G technology (final standards documents are still pending, but the 5G signals is currently being referred to as DL-PRS), the bundling of positioning reference signal occasions has applications in LTE (4G) technology as well as in 5G technology. Accordingly, it should be understood that, unless indicated otherwise, "PRS" and "NPRS" as used herein generally refer to positioning referencing signals and narrowband positioning reference signals that may be applicable to LTE and similarly applicable to 5G technology, and is not limited to Positioning Reference Signals defined for only LTE in 3GPP TS 36.211. By way of example, a single bundle of consecutive PRS occasions may include the same number of occasions used in a conventional location session.

Thus, in some implementations, all PRS occasions in a location session may be bundled together close in time or consecutively. With this implementation, the mobile device power consumption is significantly reduced and the position fix is far less susceptible to clock drift and mobile device motion. Further, the bundles of PRS occasions may be transmitted over time, e.g., with a periodicity, such that the overall impact on network throughput may be minimized. While the position fixes for a mobile device using the bundled PRS occasions may occur only during transmission of a bundle of PRS occasions, which may be spaced several minutes apart, this may be acceptable for many use cases, e.g., where position fixes are infrequently required.

FIG. 1 shows an architecture of a system 100 capable of providing Location Services (LCS) to a mobile device 120. The system 100 enables the transfer of location assistance data and/or location information, using messages such as Long Term Evolution (LTE) Positioning Protocol (LPP) or LPP Extensions (LPPe) messages between the mobile device 120 and a location server 150 or another network entity, e.g., via base station 140. The transfer of the location information may occur at a rate appropriate to both mobile device 120 and base station 140. LPP is well-known and described in various publicly available technical specifications, such as 3GPP TS 36.355. LPPe has been defined by the Open Mobile Alliance (OMA) and may be used in combination with LPP such that an LPP message contains an embedded LPPe message, with the combined LPP and LPPe protocol being referred to as LPP/LPPe.

The system 100 is illustrated as including multiple (base station) antennas 140-1, 140-2, 140-3 and/or 140-4 (sometimes collectively referred to as antennas 140 or base stations 140) that are in associated cells 145-1, 145-2, 145-3 and 145-4 (sometimes collectively referred to as cells 145). The system 100 further illustrates multiple Space Vehicles (SVs) 180-1, 180-2 (sometimes collectively referred to as SVs 180). For simplicity, only one mobile device 120 and one base station 140 are shown in FIG. 1. In general, system 100 may comprise multiple cells indicated by 145-$k$ ($1 \leq k \leq N_{cells}$, where $N_{cells}$ is the number of cells), multiple networks 130, multiple LCS clients 160, multiple mobile devices 120, multiple servers 150, multiple (base station) antennas 140, and multiple SVs 180. System 100 may comprise any number of cells including macrocells such as cells 145-1, 145-2, 145-3, and 145-4 in a manner consistent with embodiments disclosed herein.

Mobile device 120 may be capable of wirelessly communicating with base station 140 through one or more networks 130 that support positioning and location services. Support of location services may be provided by a number of location solutions that include but are not limited to the Secure User Plane Location (SUPL) location solution defined by OMA and the Control Plane location solution defined by 3GPP (e.g. in 3GPP TS 36.305) for use with an LTE serving network. For example, Location services (LCS) may be performed on behalf of LCS Client 160 that accesses base station 140, e.g., via the location server 150, and issues a request for the location of mobile device 120. The location server 150 may then respond to LCS client 160 with a location estimate for mobile device 120. The location server 150 is illustrated in FIG. 1 as being connected to the base stations 140 through network 130. In some implementations, the location server 150 may be co-located with a base station 140. LCS Client 160 may also be known as a SUPL Agent—e.g. when the location solution used by base station 140 and mobile device 120 is SUPL. In some embodiments, mobile device 120 may also include an LCS Client or a SUPL agent (not shown in FIG. 1) that may issue a location request to some positioning capable function within mobile device 120 and later receive back a location estimate for mobile device 120. The LCS Client or SUPL Agent within mobile device 120 may perform location services for the user of mobile device 120—e.g. may provide navigation directions or identify points of interest within the vicinity of mobile device 120.

Base station 140 as used herein may be a SUPL Location Platform (SLP), an Enhanced Serving Mobile Location Center (E-SMLC), a Serving Mobile Location Center (SMLC), a Gateway Mobile Location Center (GMLC), a Position Determining Entity (PDE), a Standalone SMLC (SAS), a Location Management Function (LMF) and/or the like.

As illustrated in FIG. 1, the mobile device 120 may communicate with base station 140 through network 130 and one or more base station antennas 140, which may be associated with network 130. Mobile device 120 may receive and measure signals (e.g. PRS signals) from antennas 140, which may be used for position determination. For example, mobile device 120 may receive and measure signals from one or more of antennas 140-1, 140-2, 140-3 and/or 140-4, which may be associated with cells 145-1, 145-2, 145-3 and 145-4, respectively. In some embodiments, antennas 140 may form part of a wireless communication network, which may be a wireless wide area network (WWAN), wireless local area network (WLAN), a wireless personal area network (WPAN), and so on. In some embodiments, one or more of antennas 140 may act as transmission points (TPs) or positioning beacons which transmit a downlink (DL) signal such as a positioning reference signal (PRS) but are not configured to receive uplink (UL) signals from a mobile device 120. In these embodiments, any cell 145 associated with a TP antenna 140 may represent a coverage area within which DL signals from the TP antenna 140 can be received and measured.

The term "network" and "system" are often used interchangeably. A network 130 that is a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMax network and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A network 130 that is a WLAN may be an IEEE 802.11x network, and a network 130 that is a WPAN may be a Bluetooth network, an IEEE 802.15x network, or some other type of network. The techniques described herein may also be implemented in conjunction with any combination of WWAN, WLAN and/or WPAN networks. For example, antennas 140 and network 130 may form part of, e.g., an evolved UMTS Terrestrial Radio Access Network (E-UTRAN) (LTE) network, a W-CDMA UTRAN network, a GSM/EDGE Radio Access Network (GERAN), a 1×RTT network, a Fifth Generation (5G) New Radio (NR) network, an Evolution-Data Optimized (EvDO) network, a WiMax network or a WLAN.

Mobile device 120 may also receive signals from one or more Earth orbiting SV 180, which may be part of a satellite positioning system (SPS). SVs 180, for example, may be in a constellation of a Global Navigation Satellite System (GNSS) such as the US Global Positioning System (GPS), the European Galileo system, the Russian Glonass system or the Chinese BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 2:
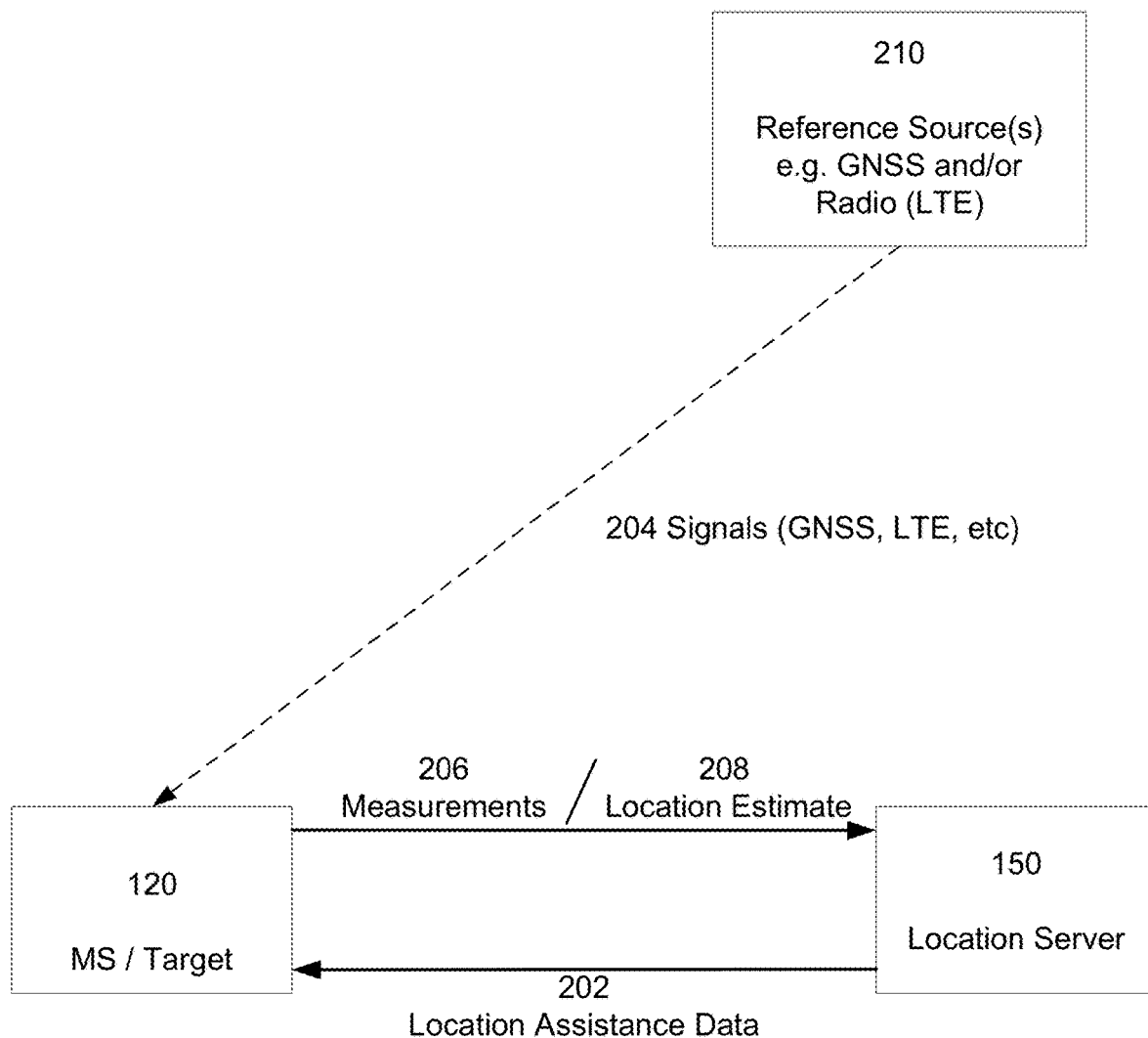
FIG. 2 shows a simplified block diagram illustrating some entities in a system capable of determining the location of a mobile device.

FIG. 2 shows a simplified block diagram illustrating some entities in a system 200 capable of determining the location of mobile device 120. Referring to FIG. 2, location server 150 may provide location assistance data 202 to mobile device 120, e.g., via base station 140 shown in FIG. 1, which may be used to assist mobile device 120 in acquiring and measuring signals 204 from reference source(s) 210 (e.g. which may comprise SVs 180 and/or cell antennas 140), and/or in deriving or refining a location estimate 208 from measurements 206. Location assistance data 202 may include base station almanac (BSA) data for nearby antennas 140 such as cell identities, TP identities, DL PRS/NPRS signal characteristics, transmission timing, antenna coordinates, and/or approximate expected RSTD measurements. Location assistance data 202 may also or instead include information for SVs 180 such as timing and ephemeris data.

In some embodiments, mobile device 120 may take the form, e.g., of a Secure User Plane (SUPL) Enabled Terminal (SET), and may communicate with base station 140 to provide an approximate location estimate 208 to location server 150 via a base station 140 (e.g. a current serving cell identity for mobile device 120) and in response receive location assistance data 202 applicable to the approximate location of mobile device 120. The mobile device 120 may use the location assistance data 202 to obtain measurements 206 from reference source(s) 210 (e.g. which may comprise SVs 180 and/or cell antennas 140), and may provide resulting location information to the location server 150. The location information, in some implementations, may be the measurements 206 themselves. The measurements 206 may comprise RSTD measurements in the case of reference sources 210 that include cell antennas 140 and/or may comprise GNSS pseudo-range or code phase values in the case of reference sources 210 that include SVs 180. The location server 150 may then generate a location estimate for mobile device 120 based on the measurements 206, which may then be communicated to an LCS client 160 (not shown in FIG. 2) and/or to mobile device 120. In some implementations, (e.g. if assistance data 202 includes the locations of cell antennas 140 and/or precise orbital data for SVs 180), mobile device 120 rather than location server 150 may determine a location estimate for mobile device 120 from the measurements 206. In this implementation, the location information sent by the mobile device 120 to location server 150 may be the determined location estimate rather than the measurements 206.

Mobile device 120 may measure signals from reference source(s) 210 to obtain measurements 206 and/or location estimate 208. Reference source(s) 210 may represent SVs 180 and/or antennas 140 associated with cells 145 in network 130. Mobile device 120 may obtain measurements 206 by measuring pseudo-ranges for SVs 180 and/or OTDOA RSTDs from antennas 140. The OTDOA RSTD measurements may be based on the measured arrival times (e.g. TOA values) of downlink radio signals (e.g. PRS or CRS signals) from a plurality of base stations (such as eNodeBs for LTE or gNodeBs for 5G NR) including one or more "neighbor cells" or "neighboring cells" relative to a "reference cell."

In some instances, the OTDOA related measurements (such as RSTDs) obtained by mobile device 120 may be sent to location server 150 to derive a position estimate for mobile device 120. The mobile device 120 may provide the RSTDs, including an identification of the reference cell and the neighbor cell for each RSTD measurement, to the location server 150 as measurements 206. The location estimate 208 provided to the location server 150 may be, e.g., a rough estimate of the position of the mobile device 120 or information from which a rough position of the mobile device 120 may be estimated, such as the cell ID of the cell serving mobile device 120 (the serving cell). In response, the location server 150 may identify the reference cell (typically, the serving cell) and neighboring cells for the OTDOA RSTD measurements, and may provide location assistance data 202 to the mobile device 120 including reference cell information and neighbor cell information.

The OTDOA measurements (e.g., RSTD measurements) obtained by mobile device 120 may in principle be performed on any DL signals from base stations, such as cell-specific reference signals (CRS) or synchronization signals. For improved hearability, however, Positioning Reference Signals (PRS) transmitted by base stations may be preferred for OTDOA measurements. PRS signals, which are defined in 3GPP TS 36.211, are transmitted by a base station (eNodeB) in special positioning slots, or subframes, that are grouped into positioning occasions. For narrowband implementations, e.g., with NB-IoT devices, narrowband PRS (NPRS) signals maybe transmitted by base stations for OTDOA measurements, as defined in 3GPP TS 36.211.

Figure 3A:
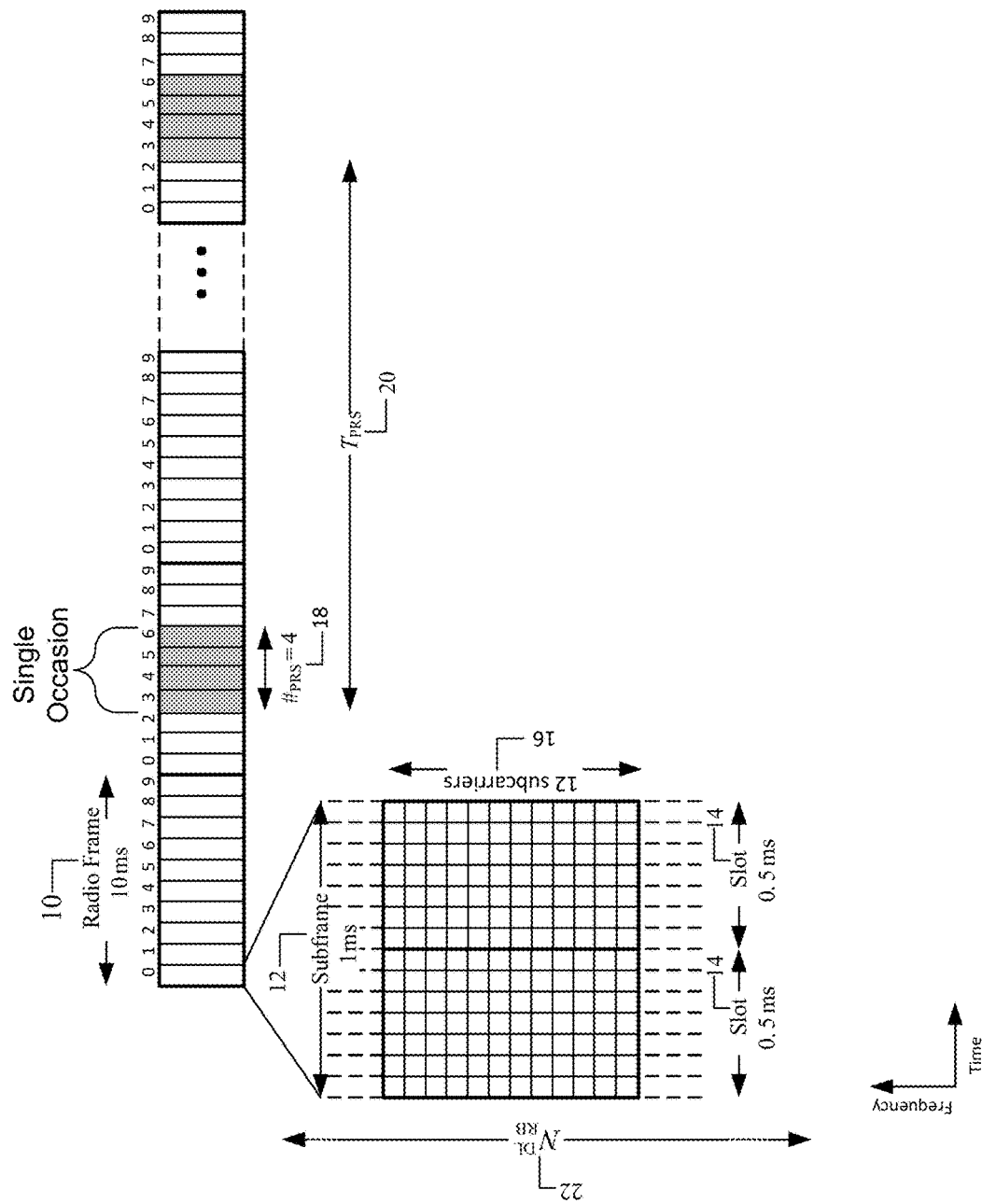
FIG. 3A shows the structure of an exemplary Long Term Evolution (LTE) frame with Positioning Reference Signals (PRS).

FIG. 3A shows the structure of an exemplary conventional LTE frame sequence for any cell that supports LTE with PRS positioning occasions. In FIG. 3A, time is represented on the X (horizontal) axis, while frequency is represented on the Y (vertical) axis. As shown in FIG. 3A, downlink and uplink LTE Radio Frames 10 are of 10 ms duration each. For downlink Frequency Division Duplex (FDD) mode, Radio Frames 10 are organized into ten subframes 12 of 1 ms duration each. Each subframe 12 comprises two slots 14, each of 0.5 ms duration.

In the frequency domain, the available bandwidth may be divided into uniformly spaced orthogonal subcarriers 16. For example, for a normal length cyclic prefix using 15 KHz spacing, subcarriers 16 may be grouped into a group of 12 subcarriers. Each grouping, which comprises 12 subcarriers 16, in FIG. 3A, is termed a resource block and in the example above the number of subcarriers in the resource block may be written as $N_{SC}^{RB}=12$. For a given channel bandwidth, the number of available resource blocks on each channel 22, which is also called the transmission bandwidth configuration 22, is given by $N_{RB}^{DL}$ 22. For example, for a 3 MHz channel bandwidth in the above example, the number of available resource blocks on each channel 22 is given by $N_{RB}^{DL}=15$.

Referring to FIG. 1, in some embodiments, antennas 140-1 to 140-4 corresponding to cells 145-1 to 145-4, respectively, may transmit PRS signals. PRS signals are transmitted by a base station (e.g. eNodeB) in special positioning slots or subframes that are grouped into positioning occasions (also referred to as PRS positioning occasions and PRS occasions). For example, in LTE, a positioning occasion can comprise a number, denoted herein as $\#_{PRS}$, of between 1 and 160 consecutive positioning subframes and can occur periodically at intervals of 5, 10, 20, 40, 80, 160, 320, 640, or 1280 milliseconds. In the example shown in FIG. 3A, the number of consecutive positioning subframes for a single positioning occasion 18 is 4 and may be written as $\#_{PRS}=4$. The positioning occasions recur with PRS Periodicity 20. In FIG. 3A, PRS Periodicity 20 is denoted by $T_{PRS}$. In some embodiments, $T_{PRS}$ may be measured in terms of the number of subframes between the start of consecutive positioning occasions.

Within each positioning occasion 18, PRS may be transmitted with a constant power. PRS can also be transmitted with zero power (i.e., muted). Muting, which turns off a regularly scheduled PRS transmission, may be useful when PRS patterns between cells overlap. Muting aids signal acquisition by mobile device 120. Muting may be viewed as the non-transmission of a PRS for a given positioning occasion in a particular cell. Muting patterns may be signaled to mobile device 120 using bitstrings. For example, in a bitstring signaling a muting pattern, if a bit at position j is set to "0", then an MS may infer that the PRS is muted for the j$^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of the Physical Cell Identifier (PCI) resulting in an effective frequency re-use factor of 6.

The PRS configuration parameters such as the number of consecutive positioning subframes, periodicity, muting pattern, PRS code sequence, etc., may be configured by network 130 and may be signaled to mobile device 120 (e.g., by location server 150 via base station 140) as part of the OTDOA assistance data. For example, LPP or LPPe messages exchanged between mobile device 120 and location server 150 may be used to transfer location assistance data 202 from location server 150 to mobile device 120 including OTDOA assistance data. OTDOA assistance data may include reference cell information and neighbor cell information. The reference cell and neighbor cell information may each contain the PCIs of the cells as well as PRS configuration parameters for the cells.

The OTDOA assistance data may include "expected RSTD" parameters, which provide mobile device 120 with information about the approximate RSTD values mobile device 120 is expected to measure at its current location together with an uncertainty of the expected RSTD parameter. The expected RSTD together with the uncertainty defines then a search window for mobile device 120 where mobile device 120 is expected to measure the RSTD value. "Expected RSTDs" for cells included in the OTDOA assistance data neighbor cell information are usually provided relative to an OTDOA assistance data reference cell. OTDOA assistance data may also include PRS configuration information parameters, which allow mobile device 120 to determine approximately when a PRS positioning occasion occurs on signals received from various cells, and to determine the PRS sequence transmitted from various cells in order to measure a TOA.

Figure 3B:
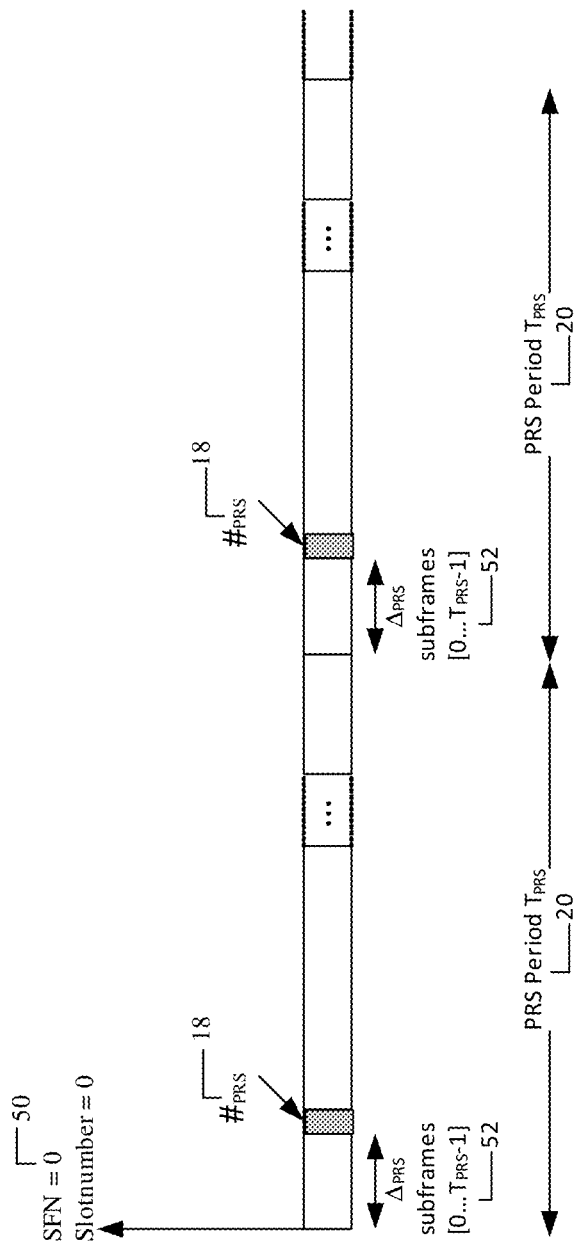
FIG. 3B illustrates the relationship between the System Frame Number (SFN), the cell specific subframe offset and the PRS Periodicity in an LTE frame.

FIG. 3B illustrates the conventional relationship between the System Frame Number (SFN), the cell specific subframe offset ($\Delta_{PRS}$) and the PRS Periodicity 20. Typically, the cell specific PRS subframe configuration is defined by a "PRS Configuration Index" $I_{PRS}$ included in the OTDOA assistance data. The cell specific subframe configuration period and the cell specific subframe offset for the transmission of positioning reference signals are defined based on the $I_{PRS}$, in the 3GPP specifications listed in Table 1 below.

TABLE 1

| Positioning reference signal subframe configuration | | |
|---|---|---|
| PRS configuration Index $I_{PRS}$ | PRS periodicity $T_{PRS}$ (subframes) | PRS subframe offset $\Delta_{PRS}$ (subframes) |
| 0–159 | 160 | $I_{PRS}$ |
| 160–479 | 320 | $I_{PRS}$ − 160 |
| 480–1119 | 640 | $I_{PRS}$ − 480 |
| 1120–2399 | 1280 | $I_{PRS}$ − 1120 |
| 2400–2404 | 5 | $I_{PRS}$ − 2400 |
| 2405–2414 | 10 | $I_{PRS}$ − 2405 |
| 2415–2434 | 20 | $I_{PRS}$ − 2415 |
| 2435–2474 | 40 | $I_{PRS}$ − 2435 |
| 2475–2554 | 80 | $I_{PRS}$ − 2475 |
| 2555–4095 | Reserved | |

A PRS configuration is defined with reference to the System Frame Number (SFN) of a cell that transmits PRS. PRS instances, for the first subframe of a PRS positioning occasion, satisfy $$(10 \times n_f + \lfloor n_s/2 \rfloor - \Delta_{PRS}) \bmod T_{PRS} = 0, \qquad \text{eq. 1}$$

where,
 $n_f$ is the SFN with 0≤SFN≤1023,
 $n_s$ is the slot number of the radio frame with 0≤$n_s$≤19,
 $T_{PRS}$ is the PRS period, and
 $\Delta_{PRS}$ is the cell-specific subframe offset.

As shown in FIG. 3B, the cell specific subframe offset $\Delta_{PRS}$ 52 may be defined in terms of the number of subframes transmitted starting from System Frame Number 0, Slot Number 0 50 to the start of a PRS positioning occasion. In FIG. 3B, the number of consecutive positioning subframes in a positioning occasion 18 is $\#_{PRS}=4$.

In some embodiments, when mobile device 120 receives a PRS configuration index $I_{PRS}$ in the OTDOA assistance data, mobile device 120 may determine PRS periodicity $T_{PRS}$ and PRS subframe offset $\Delta_{PRS}$ using Table 1. Upon obtaining information about the frame and slot timing i.e., the SFN and slot number ($n_f$, $n_s$) for cell 145-k, mobile device 120 may determine the frame and slot when a PRS is scheduled in cell 145-k.

The OTDOA assistance data is determined by location server 150 and includes assistance data for a reference cell, and a number of neighbor cells. Additionally, in a request for location information (e.g. a request for OTDOA RSTD measurements) sent by location server 150 to mobile device 120, the location server 150 typically specifies a response time, which defines some reporting time interval (e.g. 16 seconds long) within which measurements must be made by the mobile device 120 for a set of cells. During the reporting interval (also referred to herein as a reporting time interval or response time), the mobile device 120 may collect measurements from each cell during one or more positioning occasions for that cell, which may occur with a frequency of, e.g., 160 ms. Accordingly, the mobile device 120 may collect approximately 100 measurements for different cells during a 16 second reporting time interval if positioning occasions for each cell have a periodicity of 160 milliseconds. Conventionally, however, at the end of the response time, the mobile device 120 returns only a single RSTD (OTDOA) measurement for each cell, even though more than one TOA measurement may have been obtained for that cell during the reporting interval.

Figure 4:
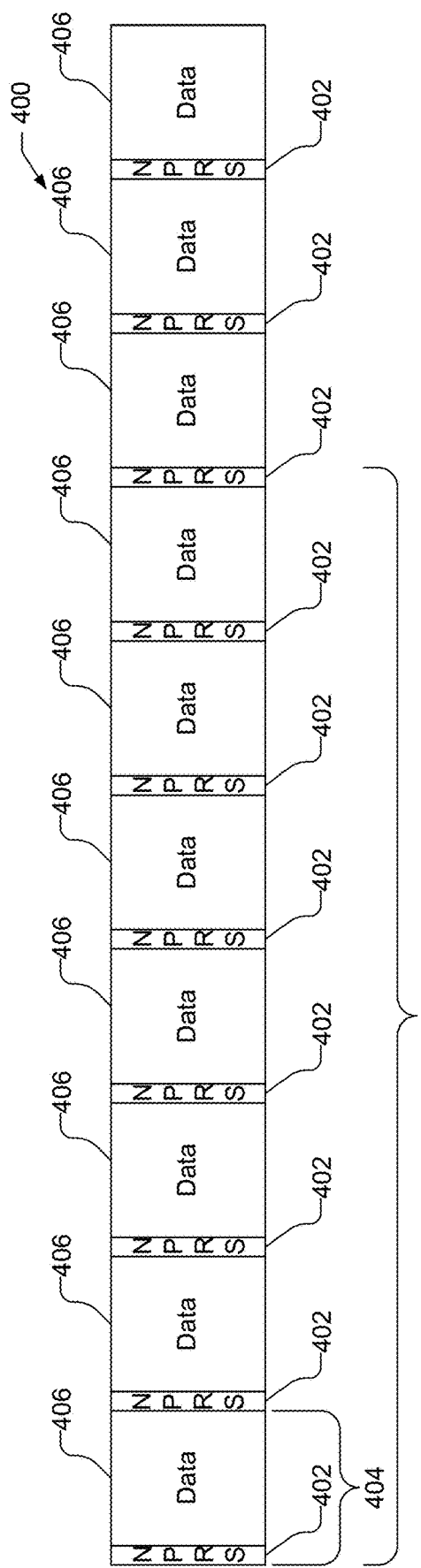
FIG. 4 illustrates a simplified transmission of PRS signals by a base station using a conventional PRS scheduling.

FIG. 4 illustrates a simplified transmission of PRS signals 400 by a base station, such as a base station 140 shown in FIG. 1, using a conventional PRS scheduling. The PRS signals 400, by way of example, are transmitted during positioning occasions 402 and may be either non-narrow-band PRS signals, e.g., such as those illustrated in FIGS. 3A and 3B or narrowband PRS signals (NPRS). The configuration of PRS signals illustrated in FIG. 4 is substantially similar to the PRS signals discussed above in FIGS. 3A and 3B. For example, as with PRS signals shown in FIG. 3A, the PRS signals 400 includes positioning occasions 402 that are separate and have a periodicity 404 that may be 160, 320, 640, 1280 ms (or subframes). As illustrated, between each occurrence of a positioning occasion 402, data 406 may be transmitted by the base stations. If the PRS signals 400 are non-narrowband PRS signals, such as those illustrated in FIGS. 3A and 3B, each positioning occasion may include a number of consecutive subframes #$_{PRS}$ of between 1 and 160. Where the PRS signals 400 are NPRS signals, each positioning occasion 402 may similarly include a number of consecutive subframes which may be greater than used with PRS signals, e.g., 10, 20, 40, 80, 160, 320, 640, 1280 subframes. NPRS positioning occasions typically include more subframes than PRS positioning occasions to at least partially compensate for the reduced bandwidth of NPRS. In addition, similar to the PRS signals discussed in FIGS. 3A and 3B, one or more positioning occasions 402 in the PRS signals 400 may be muted and subframe offsets may be used.

As discussed previously, the use of narrowband PRS (NPRS) for OTDOA using conventional PRS scheduling, will have a significant network impact. The more narrow-band that a PRS deployment is, the longer the required positioning occasion length (i.e., the number of sub-frames) for operations at a constant carrier to interference plus noise ratio (CINR) level. For example, narrowband internet of things (NB-IoT) positioning occasions may last 80 subframes which is equal to 80 ms. Further, there are only limited options for the periodicity of NPRS, e.g., periodicity may be {5,10,20,40,80,160,320,640,1280} ms. With a conventional OTDOA approach using NPRS with conventional PRS scheduling, as illustrated in FIG. 4, the number of subframes in a positioning occasion may be 80 while the maximum period may be 1280 ms, which results in a network throughput of 6.25% (=80 ms/1280 ms). In comparison, if conventional PRS signals, as illustrated in FIGS. 3A and 3B, are used, with 4 subframes in a positioning occasion and a maximum period of 1280 ms, the resulting network throughput is 0.3% (=4 ms/1280 ms). Thus, the increased positioning occasion length (i.e., increased number of subframes in each positioning occasion) that is required for NPRS due to the reduced bandwidth and to maintain CINR level, greatly reduces the network bandwidth for communication purposes without providing an improvement in positioning, which may prevent the deployment of NPRS. Moreover, while the periodicity of NPRS signals may be increased from the current maximum period of 1280 ms in order to offset the effect of NPRS on network throughput, increasing the periodicity will have deleterious effects on the mobile device and positioning accuracy.

Position determination, e.g., using OTDOA and NPRS signals having conventional PRS scheduling may have a significant impact on the mobile device itself. For example, as illustrated in FIG. 4, a single positioning session 408 of a mobile device, such as mobile device 120 in FIG. 1, extends over multiple non-consecutive positioning occasions 402. In conventional PRS deployments, positioning sessions typically last 16 seconds, and the periodicity is 160 ms. Thus, a positioning session that would produce one position fix may encompass up to 100 PRS positioning occasions. A positioning session with the same 100 positioning occasions that uses NPRS with 1280 ms periodicity would last 100*1280 ms=128 seconds, or just over 2 minutes. OTDOA requires the use of contiguous clocks during the entire positioning session in order to relate measurements from different occasions. Thus, during a positioning session, the power consumption of a mobile device is largely the same during a positioning occasion 402 and outside a positioning occasion, e.g. during a period of data 406 transmission by the base station. Accordingly, power consumption of a mobile device will be significantly increased if NPRS signals are used due to, e.g., a 2 minute position session, as opposed to a 16 second position session for PRS signals. A mobile device using NPRS signals, such as a NB-IoT, may have limited battery resources rendering the increased power consumption especially problematic. Further, if the periodicity of the NPRS positioning occasions is increased beyond 1280 ms to offset the impact of increased positioning occasion length on network throughput, as discussed above, the positioning session length will necessarily increase and power consumption of the mobile device would likewise further increase.

Additionally, position determination, e.g., using OTDOA and NPRS signals having conventional PRS scheduling may have a significant impact on the accuracy of the position determination due to the required length of a positioning session of a mobile device. For example, a long positioning session 408 for the mobile device creates problems related to clock drift as well as the motion of the mobile device, both of which adversely affect the accuracy of the estimated position of the mobile device. For example, over a 2 minute positioning session, a mobile device may move a considerable distance and the clock may drift by a considerable amount. If a mobile device is traveling at, e.g., 60 mph, the mobile device may move 2 miles between measurements made using positioning occasions at the beginning and end of the positioning session, resulting in a wildly inaccurate position estimate. Clock drift during a 2 minute positioning session may have a similar impact on the resulting position estimate. Moreover, if the periodicity of the NPRS positioning occasions is increased to offset the impact of increased positioning occasion length on network throughput, as discussed above, the positioning session length will necessarily increase resulting in a further reduction in accuracy of the position estimate due to clock drift and motion of the mobile device.

Additionally, even with the use of non-narrowband PRS signals, e.g., as illustrated in FIGS. 3A and 3B, using conventional scheduling may produce an unacceptable error, e.g., where the mobile device is moving. By way of example, if PRS occasions have a periodicity of 160 ms apart and the mobile device is moving at 30 m/s, there may be an error of approximately 5 m due to motion of the mobile device. If a desired accuracy for a target device is in a range of 1-10 m, e.g., as in 5G NR applications, an error of 5 m due simply to movement of the mobile device may be problematic.

The above-described problems may be resolved by bundling together a number of PRS occasions (either non-narrowband PRS or narrowband PRS (NPRS)), close in time or back-to-back, e.g., consecutively. For example, a single bundle of consecutive PRS occasions may include the same number of occasions that may be used in a conventional OTDOA location session. Thus, in some implementations, all PRS occasions in a location session may be bundled together close in time or consecutively. With the PRS positioning occasions bundled together, the mobile device may measure a desired number of positioning occasions in a significantly shorter amount of time, i.e., the length of the positioning session is reduced, and accordingly, power consumption is significantly reduced and the position fix is far less susceptible to clock drift and mobile device motion. Moreover, the bundles of PRS occasions may be spaced apart, such that the overall impact on network throughput may be minimized. For example, the bundles of PRS occasions may have a periodicity of 2 minutes in order to offset the effect of the increase in number of subframes in each positioning occasion on network throughput. Of course, the periodicity may vary based on the number of subframes in a positioning occasion, the number of positioning occasions in a bundle, and the desired network throughput. While the position fixes for a mobile device using the bundled PRS occasions may occur only during transmission of a bundle of PRS occasions, which may be spaced several minutes apart, this may be acceptable for many use cases, e.g., where position fixes are infrequently required.

Figure 5A:
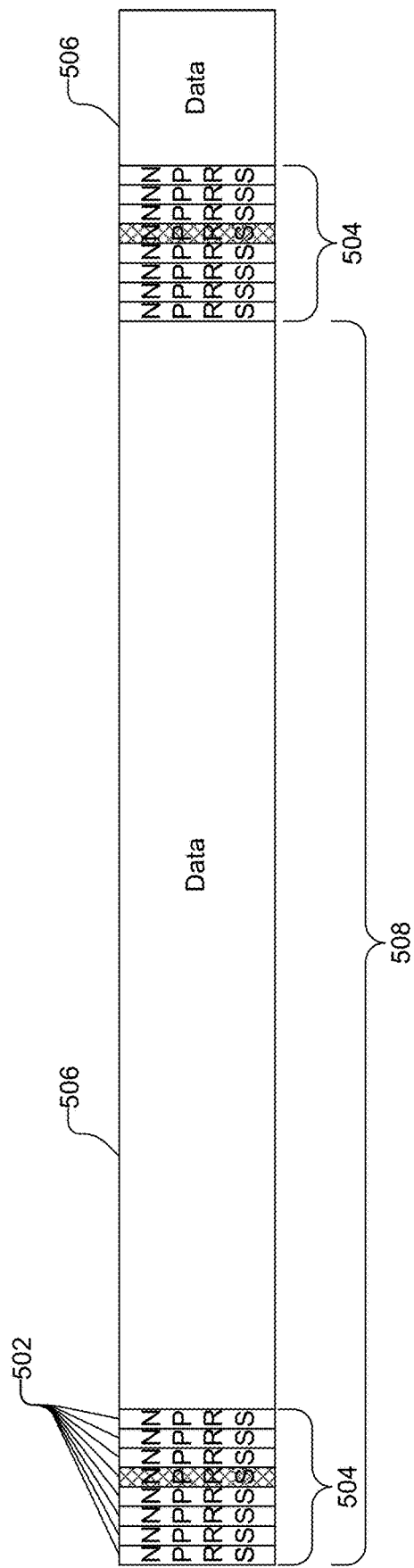
FIG. 5A illustrates a simplified transmission of bundled PRS signals by a base station.

FIG. 5A illustrates transmission of bundled PRS signals 500 by a base station, such as a base station 140 shown in FIG. 1 or by a mobile device, such as the mobile device 120 shown in FIG. 1. The PRS signals 500, by way of example, are transmitted during positioning occasions 502 and are sometimes referred to herein as positioning reference signal occasions or PRS positioning occasions when referring to downlink transmission by a base station and positioning sounding reference signal occasions or PRS positioning sounding occasions when referring to uplink transmissions by a mobile device. It should be understood that the positioning reference signals transmitted during positioning occasions 502 may be non-narrowband PRS signals, narrowband PRS signals (NPRS), 5G DL-PRS signals or 5G UL-PRS signals. If the bundled PRS signals 500 are NPRS signals, they may be transmitted by the base station, such as an eNodeB or gNodeB, in a dedicated frequency band for NB-IoT (i.e. stand-alone), or the signal can be transmitted on a sub-band of a legacy LTE deployment (i.e. in-band). Each PRS positioning occasion 502 may be similar to a PRS positioning occasion 402 shown in FIG. 4, except that a plurality of PRS positioning occasions 502 are transmitted consecutively in bundles 504. As with PRS positioning occasions 402 discussed in FIG. 4, each PRS positioning occasion 502 may include a number of consecutive subframes, e.g., 1-160 subframes if PRS positioning occasions 502 are non-narrowband, and 10, 20, 40, 80, 160, 320, 640, 1280 subframes if PRS positioning occasions 502 are narrowband. Moreover, one or more positioning occasions 502 in each bundle 504 in the NPRS signals 500 may be muted in which the PRS in each subframe of the positioning occasion is transmitted with zero power, which is illustrated in FIG. 5A by cross-hatching. Additionally, subframe offsets may be used with the PRS signals. Additionally, where beam sweeping is used, e.g., in a 5G network, the base station may transmit PRS positioning occasions 502 sequentially in each beam sweep, i.e., a beam sweep may include one or more PRS positioning occasions 502.

In FIG. 5A, the PRS positioning occasions 502 are consecutive so that periodicity of the PRS positioning occasions is equal to the number of subframes in each PRS positioning occasion 502. The number of PRS positioning occasions 502 in each bundle 504, for example, may be a number of positioning occasions required by an OTDOA positioning session of a mobile device. In other words, the length of an OTDOA positioning session of a mobile device may be approximately the length of one bundle 504 of PRS positioning occasions 502. With the use of bundles 504 of positioning occasions 502, however, a reduced number of positioning occasions may be necessary during a positioning session by a mobile device. For example, while 80-100 positioning occasions 402 may be required for an OTDOA positioning session using PRS signals 400 shown in FIG. 4, with the bundled PRS transmission 500 shown in FIG. 5A, the number of positioning occasions 502 required for an OTDOA positioning session may be reduced to less than 80 positioning occasions, e.g., each bundle 504 may include 20, 40, 60, or 80 positioning occasions, or any number in between. If desired, however, additional positioning occasions 502, e.g., 80-100, may be included in each bundle 504. As an example, a PRS deployment with 80 ms occasions and a 100 occasion positioning session would last only 8 seconds, with a reduction by a factor of 16 of the motion/clock drift error impact and a similar reduction of the total consumed power per position fix.

As illustrated, between bundles 504 of positioning occasions 502, the base station may transmit data 506. The bundles 504 of positioning occasions 502 may be transmitted with a periodicity 508. If desired, however, the bundles 504 may be transmitted on-demand, e.g., as requested by a mobile device 120 or base station 140, and thus, the bundles 504 may not have a stable periodicity. For example, if the base station (or a location server) identifies that multiple mobile devices are requesting positioning, a bundle of positioning occasions may be dynamically scheduled. The separation between bundles of positioning occasions 502 may be sufficient to ensure that a desired network throughput despite the relatively longer PRS positioning occasions (i.e., increased number of subframes in each positioning occasion) relative to PRS, if the PRS positioning occasions are narrowband due to the reduced bandwidth of NPRS. For example, in some implementations, the periodicity may be greater than a minute. Assuming the same overhead as predominant PRS deployments of 1 ms per 160 ms=0.625%, in an implementation where a single positioning occasion 502 includes 40 subframes and a bundle 504 includes 20 consecutive NPRS positioning occasions, for example, the bundles 504 may have a periodicity of approximately 2 min. Of course, the periodicity 508 may vary based on the number of subframes in a positioning occasion 502 and the number of positioning occasions in a bundle, and the desired network throughput.

With the length of an OTDOA positioning session of a mobile device approximately the length of one bundle 504 of PRS positioning occasions 502, the mobile device may use contiguous clocks throughout the OTDOA positioning session, but the power requirements of the mobile device are substantially reduced compared to that of a mobile device using PRS signals 400 shown in FIG. 4. Moreover, impacts of clock drift and motion of the mobile device are significantly reduced with the use of bundled PRS signals 500 because the length of the positioning session of the mobile device is significantly reduced. For example, assuming the mobile device is moving at 30 m/s and the positioning session lasts only 8 seconds due to the bundled positioning occasions, the mean motion error is bounded by 0.25 m, as opposed to 5 m for conventional non-bounded positioning occasions. To additionally compensate for clock drift in the mobile device, the PRS signals may be used to calibrate the clock in the mobile device.

Figure 5B:
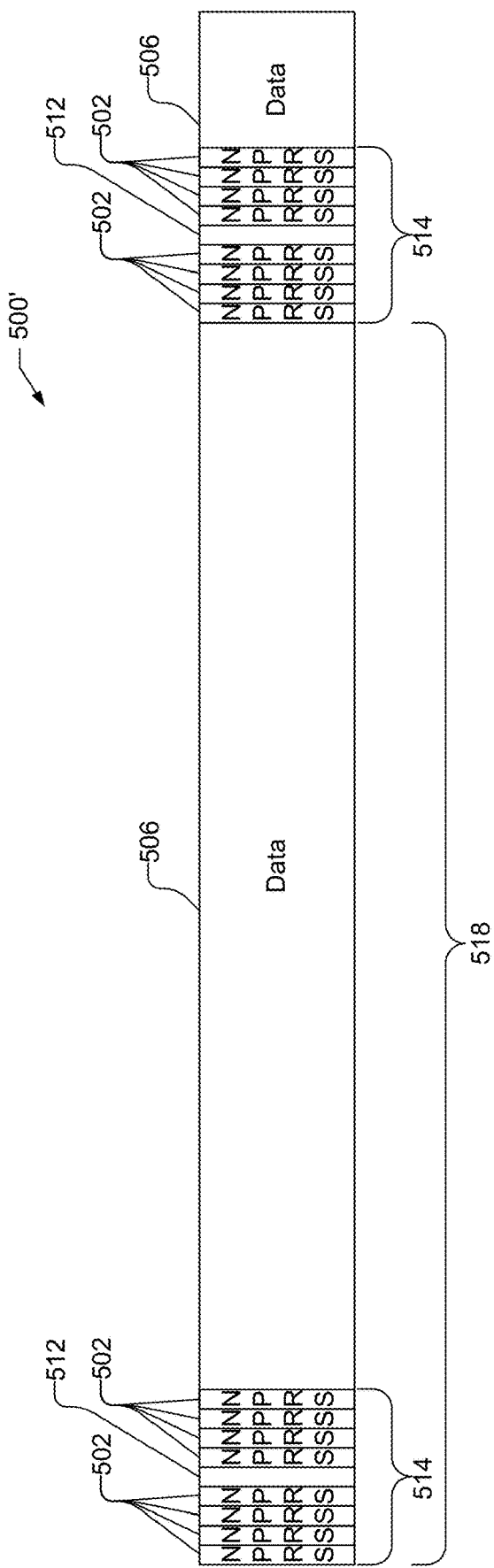
FIG. 5B illustrates another simplified transmission of bundled PRS signals by a base station.

FIG. 5B illustrates another implementation of transmission of bundled PRS signals 500' by a base station, such as a base station 140 shown in FIG. 1 or by mobile device, such as the mobile device 120 shown in FIG. 1. The bundled PRS signals 500' are similar to bundled PRS signals 500 shown in FIG. 5A, like designated elements being the same. As illustrated multiple PRS positioning occasion 502 are included in bundles 514. Data 506 may be transmitted by the base station between transmissions of the bundles 514 of PRS positioning occasions 502. The bundles 514 of PRS positioning occasions 502 may have a periodicity 518 that is adequate to maintain a desired network throughput. As illustrated in FIG. 5B, each bundle 514 may include non-consecutive PRS positioning occasions 502. For example, as illustrated, PRS positioning occasions may be separated by a small number of subframes 512, e.g. 1, which may be used to transmit data and/or any other information. The transmission of subframes 512, which is not a PRS positioning occasion, in a bundle 514 may be useful, for example, if the transmission of the data or other information in subframes 512 cannot be delayed for the entire duration of the bundle 504. The length of the separation between non-consecutive PRS positioning occasions 502 may be limited. For example, the length of the separation between PRS positioning occasions may be no more than the length of a single positioning occasion. Moreover, if desired, multiple PRS positioning occasions 502 in each bundle 514 may be non-consecutive. Spacing the positioning occasion within a bundle by a small number of sub-frames would have a small additional impact to motion/clock drift sensitivity and to power consumption. For example, spacing 40 ms long positioning occasions by 1 ms and using 20 occasions per bundle would result in an additional bundle duration of only 20 ms, or a 100%*20 ms/800 ms=2.5% increase in motion/clock drift sensitivity and a similar increase in power consumption.

Figure 6A:
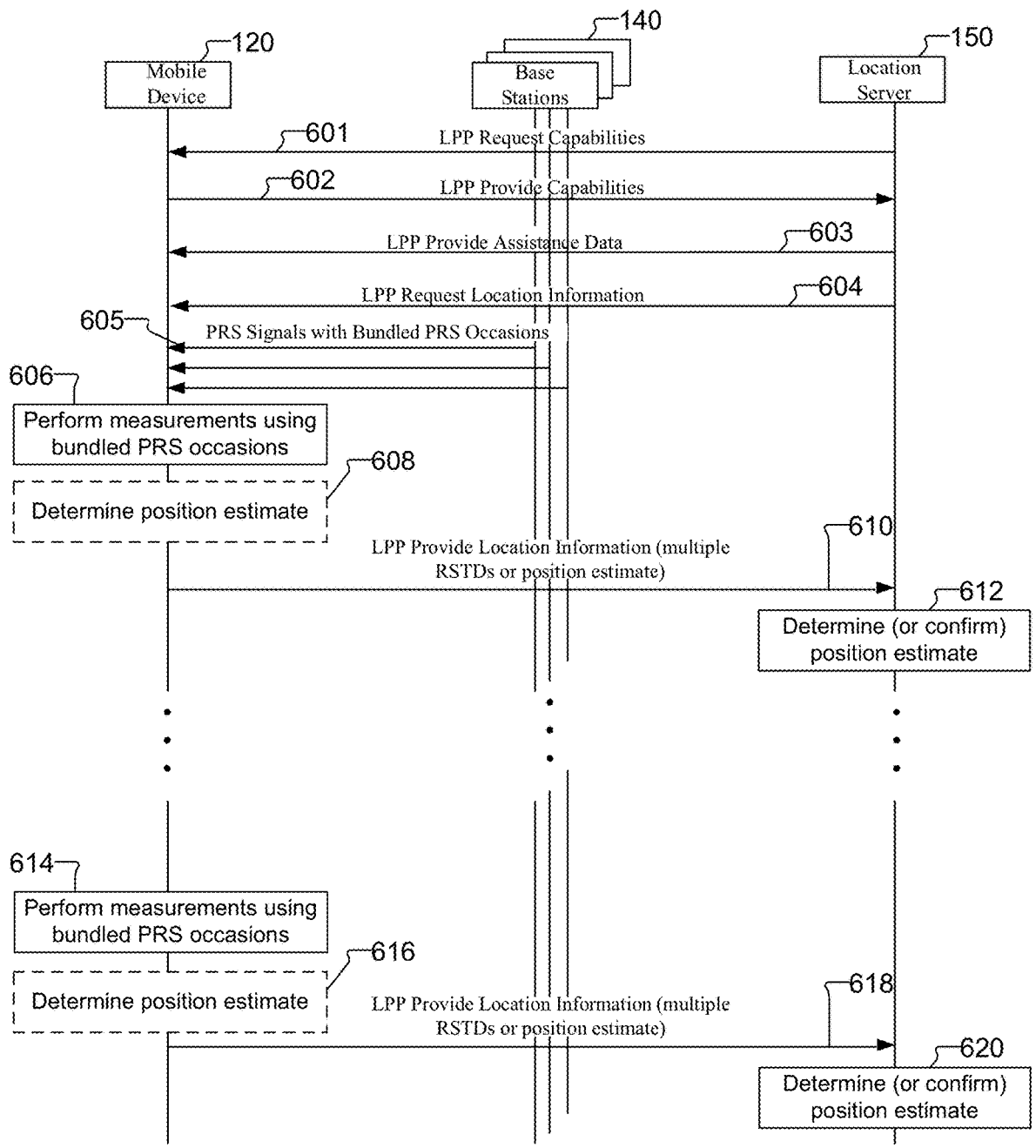
FIG. 6A illustrates exemplary message flow of a procedure that supports downlink positioning methods using bundled PRS signals in a manner consistent with disclosed embodiments.

FIG. 6A illustrates an exemplary message flow 600 of a procedure that supports position determination using a downlink positioning method such as, e.g., OTDOA, DL-TDOA), DL AoD, or ECID, in which the mobile device 120, which may be an NB-IoT device, measures bundled PRS occasions for one or more measurements. In some implementations, the PRS occasions are non-narrowband PRS signals and in some implementations, the PRS occasion are narrowband PRS (NPRS) signals.

At stage 601, location server 150, which may take the form of an Enhanced Serving Mobile Location Centre (E-SMLC) or a SUPL SLP for LTE (or Location Management Function (LMF) for 5G NR), may transmit to the mobile device 120 a Request Capabilities message (e.g. an LPP Request Capabilities message) to request the positioning capabilities of mobile device 120, such as the OTDOA positioning capabilities of mobile device 120. In response, at stage 602, the mobile device 120 sends a Provide Capabilities message (e.g. an LPP Provide Capabilities message) to the location server 150 to provide the positioning capabilities of mobile device 120. If OTDOA positioning capabilities were requested in stage 601, the Provide Capabilities message may include the OTDOA positioning capabilities of mobile device 120 such as the OTDOA modes supported by mobile device 120 (e.g. MS assisted OTDOA and/or MS based OTDOA), supported frequency bands, support for inter-frequency RSTD measurements, and support for bundled PRS occasions.

At stage 603, the location server 150 may send a Provide Assistance Data message (e.g. an LPP Provide Assistance Data message) to the mobile device 120 with assistance data for the positioning method. The assistance data may include assistance data for the reference cell and assistance data for a number of neighbor cells. For example, the assistance data may include configuration parameters defining PRS signals transmitted by the reference cell and each neighbor cell.

At stage 604, the location server 150 sends a Request Location Information message (e.g. an LPP Request Location Information message) to the mobile device 120 to request RSTD measurements for positioning. This message may include information elements such as the location information type required (e.g. indicating measurements or a location estimate), a desired accuracy of a location estimate, and a response time interval (also referred to herein as a reporting time interval).

At stage 605, the base stations 140 transmit PRS signals with bundled PRS occasions as discussed in FIGS. 5A and 5B. The PRS occasions may be transmitted sequentially over multiple beam sweeps in some implementations, e.g., in a 5G network. The base station transmits 140 transmits one or more subframes of non-position referencing signal occasions between bundled PRS occasions, wherein one or more subframes of non-position referencing signal occasions are transmitted between the first bundle and the second bundle and no position referencing signal occasions are transmitted between the first bundle and the second bundle.

At block 606, the mobile device 120 performs the measurements, e.g., RSTD measurements, on the PRS signals using the provided assistance data. As discussed previously, for OTDOA, the mobile device 120 may perform multiple TOA measurements per cell using bundled PRS occasions during the response time interval and may generate one or more TOA measurements for the reference cell and one or more RSTD measurements and/or one or more TOA measurements for each neighbor cell. The mobile device 120 may generate a position estimate using the measurements.

At optional block 608, the mobile device 120 may use the measurements based on bundled PRS occasions, e.g., RSTD measurements, any TOA measurements and the measurement times or other measurement information generated at block 606 to determine the location of mobile device 120. For example, the mobile device 120 may use the known locations of the base stations (e.g. antennas 140) for the cells (e.g. cells 145) provided in assistance data at stage 603 and the measurement information generated at block 606 to determine the location, e.g., using trilateration or other appropriate techniques.

At stage 610, the mobile device 120 sends location information (e.g. an LPP Provide Location Information message) to the location server 150. The location information may include one or more measurements performed using the bundled PRS signals for each of one or more neighbor cells and the reference cell from block 606. For example, the measurement time for an RSTD measurement for each neighbor cell may be the measurement time for a TOA measurement for the neighbor cell that was used to determine the RSTD measurement. The Provide Location Information message may further include other information elements, such as a time stamp for the most recent RSTD measurement (e.g. in the form of the System Frame Number (SFN) for the reference cell), an identity of the reference cell used for determining the RSTDs, a quality of the TOA measurement from the reference cell, a neighboring cell measurement list, an identity of each of the measured neighbor cells, the quality of each of the RSTD measurements. The mobile device 120 may further include in the Provide Location Information message: (i) a measurement time for a TOA measurement for the reference cell that was used to determine the RSTD measurements; (ii) one or more TOA measurements for the reference cell; (iii) one or more TOA measurements for each of one or more neighbor cells; and/or (iv) a measurement time for each TOA measurement in (ii) and/or (iii). The measurement times included in the Provide Location Information message may be specified relative to a common reference time. The common reference time may be indicated using a timestamp (e.g. a reference cell SFN) for the most recent RSTD measurement, an indication of the start of the response time interval or the time of a TOA measurement for the reference cell (e.g. the TOA measurement for the reference cell that was used to determine each of the provided RSTD measurements). A measurement time that is specified relative to another time may further be specified in terms of (e.g. may include units of) PRS positioning occasions, LTE radio frames, LTE subframes and/or a count of the number of SFN wrap around occasions for either the cell to which the measurement time refers or the reference cell. Any measurement time included in the Provide Location Information message may further be specified as an absolute time (e.g. a GPS time, GNSS time or UTC). Of course, if a downlink based positioning method other than OTDOA is performed, the location information provided at stage 610 will include the information relevant to the particular positioning method performed. In another implementation, the location information provided at stage 610 may be an estimate of the location of the mobile device 120 determined by the mobile device 120 at block 608.

At block 612, the location server 150 may use the measurements based on bundled PRS occasions, e.g., RSTD measurements, any TOA measurements and the measurement times or other measurement information provided by the mobile device 120, provided at stage 610, to determine the location of mobile device 120 or, optionally, to confirm a position estimate provided by the mobile device 120 at stage 610. For example, the location server 150 may use the known locations of the base stations (e.g. antennas 140) for the cells (e.g. cells 145) measured by the mobile device 120 at block 606 as well as the measurement information received in stage 610 to determine the location, e.g., using trilateration or other appropriate techniques.

At block 614, the mobile device 120 may perform additional measurements using another set of bundled PRS occasions, which are separated in time from the first set of bundled PRS occasions measured at block 606. By way of example, the first set of bundled PRS occasions measured at block 606 and the second set of bundled PRS occasions measured at block 614 may be separated by more subframes that the number of subframes in the first set of bundled PRS occasions. The first set of bundled PRS occasions measured at block 606 and the second set of bundled PRS occasions measured at block 614 may be separated, e.g., by more than one minute. Similar to the discussion at block 606, in block 614 the mobile device 120 may perform, e.g., multiple TOA measurements per cell using the bundled PRS occasions during the response time interval and may generate one or more TOA measurements for the reference cell and one or more RSTD measurements and/or one or more TOA measurements for each neighbor cell.

At optional block 616, the mobile device 120 may use the measurements based on bundled PRS occasions, e.g., RSTD measurements, any TOA measurements and the measurement times or other measurement information generated at block 614 to determine the location of mobile device 120. For example, the mobile device 120 may use the known locations of the base stations (e.g. antennas 140) for the cells (e.g. cells 145) provided in assistance data at stage 603 and the measurement information generated at block 614 to determine the location, e.g., using trilateration or other appropriate techniques.

At stage 618, similar to stage 610, the mobile device 120 may provide location information (e.g. an LPP Provide Location Information message) to the location server 150. As discussed at stage 610, the location information may include one or more measurements performed using the bundled PRS signals or an estimate of the location of the mobile device 120 determined by the mobile device 120 based on measurements performed using the bundled PRS signals.

At block 620, similar to block 612, the location server 150 may use the measurements based on bundled PRS occasions, any TOA measurements and the measurement times or other measurement information provided by the mobile device 120 at stage 618, to determine the location of mobile device 120 or, optionally, to confirm a position estimate provided by the mobile device 120 at stage 618. By determining the position of the mobile device 120 at multiple times, e.g., at block 612 and 620, a more accurate position of the mobile device may be estimated.

Figure 6B:
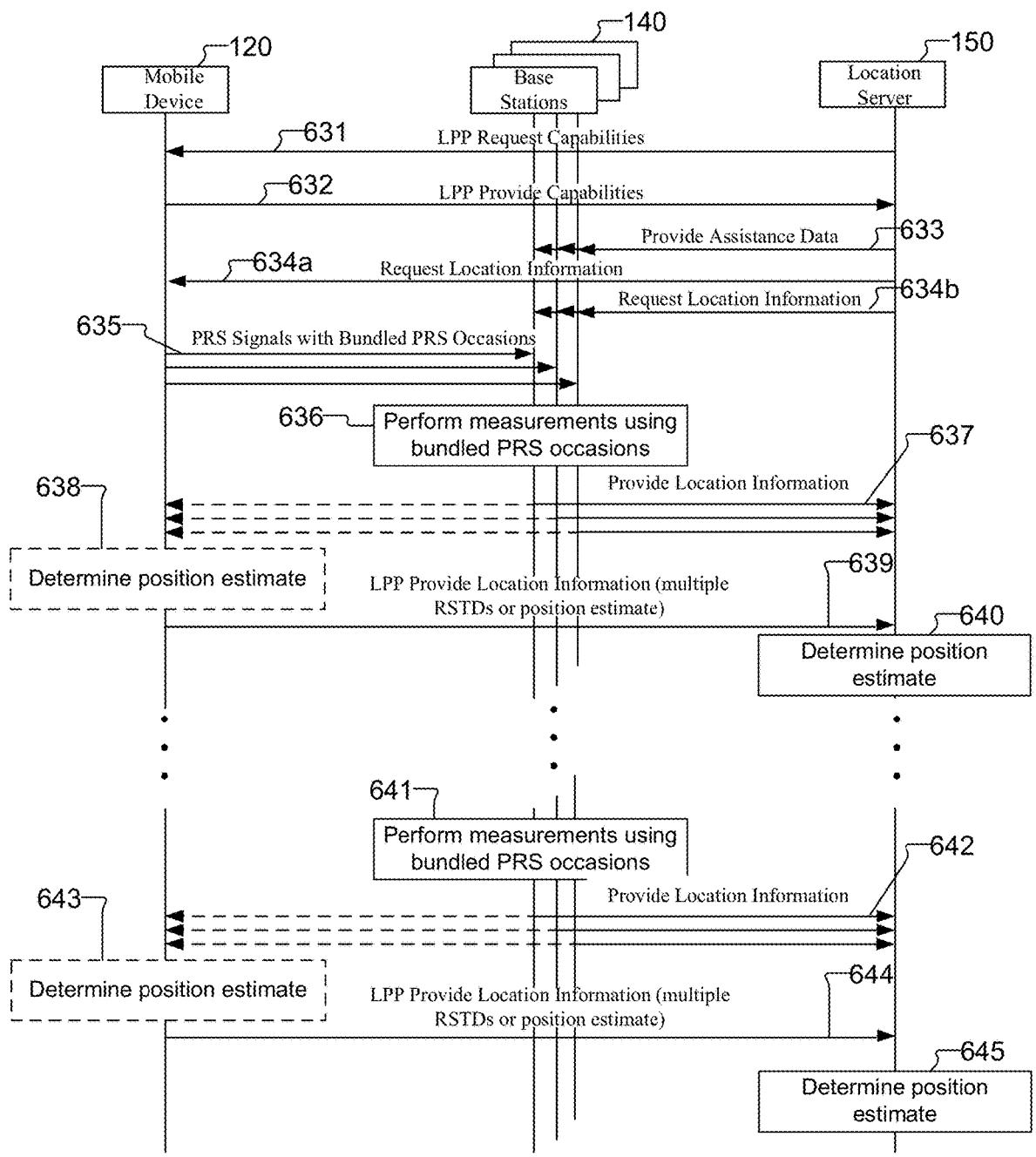
FIG. 6B illustrates exemplary message flow of a procedure that supports uplink positioning methods using bundled PRS signals in a manner consistent with disclosed embodiments.

FIG. 6B illustrates an exemplary message flow 630 of a procedure that supports position determination using a uplink positioning method such as, e.g., UTDOA, UL-AoA or UL-RTOA, in which the base station 140 measures bundled PRS occasions transmitted by the mobile device 120 for one or more measurements. In some implementations, the PRS occasions are non-narrowband PRS signals and in some implementations, the PRS occasion are narrowband PRS (NPRS) signals.

At stage 631, location server 150, which may take the form of an Enhanced Serving Mobile Location Centre (E-SMLC) or a SUPL SLP for LTE (or Location Management Function (LMF) for 5G NR), may transmit to the mobile device 120 a Request Capabilities message (e.g. an LPP Request Capabilities message) to request the positioning capabilities of mobile device 120, such as the UL-TDOA positioning capabilities of mobile device 120. In response, at stage 632, the mobile device 120 sends a Provide Capabilities message (e.g. an LPP Provide Capabilities message) to the location server 150 to provide the positioning capabilities of mobile device 120. If UL-TDOA positioning capabilities were requested in stage 631, the Provide Capabilities message may include the UL-TDOA positioning capabilities of mobile device 120 such as supported PRA capabilities including support for bundled PRS occasions.

At stage 633, the location server 150 may send a Provide Assistance Data message (e.g. a Provide Assistance Data message) to the base stations 140 with assistance data for the positioning method. The assistance data may include configuration parameters defining PRS signals transmitted by the mobile device 120. Additionally, assistance data may be transmitted to the mobile device 120, e.g., if a mobile device based positioning procedure is to be used.

At stage 634a, the location server 150 sends a Request for Periodic UL signals message (e.g. a Request for Periodic UL signals message) to the mobile device 120 to request transmission of PRS signals for positioning. In some implementations, instead of the location server, a base station 140 may send an RRC Request for Periodic UL signals. The request may include details about the required UL signals (e.g. coding, bandwidth, carrier frequency, frequency and timing of transmission, and/or a start time and end time for transmission). At stage 634b, the location server 150 may send a Request Location Information message (e.g. an Request Location Information message) to the base stations 140 to request measurements for positioning. This message may include information elements such as the location information type required (e.g. indicating measurements or a location estimate), a desired accuracy of a location estimate, and a response time interval (also referred to herein as a reporting time interval).

At stage 635, the mobile device 120 commences to transmit the UL PRS signals with bundled PRS occasions, sometimes referred to herein as position sounding referencing signal occasions, as discussed in FIGS. 5A and 5B. The mobile device 120 may delay transmissions of bundled PRS occasions, e.g., by transmitting one or more subframes of non-PRS occasions or entering idle mode between bundled PRS occasions. No position sounding referencing signal occasions are transmitted between bundled PRS occasions.

At block 636, the base stations 140 receive the UL PRS signals and obtain the desired measurements, e.g., UL-TDOA, of the UL PRS using bundled PRS occasions.

At stage 637, the base stations 140 send location information (e.g. a Provide Location Information message) to the location server 150. The location information may include one or more measurements performed by each base station 140 using the bundled PRS signals. If desired, neighbor base stations 140 may send the location information to a serving base station and the serving base station may transmit the information to the location server 150. For example, the measurement time from each base station may be the measurement time. Optionally, as illustrated with dotted lines, the base stations 140 may send the location information to the mobile device 120, e.g., for a mobile device based positioning procedure.

At optional block 638, e.g., if the base stations 140 sent the location information to the mobile device 120 at stage 637, the mobile device 120 may use the measurements performed by the base stations 140 using the bundled PRS occasions, e.g., RSTD measurements, any TOA measurements and the measurement times or other measurement information generated at block 636 to determine the location of mobile device 120. For example, the mobile device 120 may use the known locations of the base stations (e.g. antennas 140) for the cells (e.g. cells 145) provided in assistance data discussed at stage 633 and the measurement information generated at block 636 to determine the location, e.g., using trilateration or other appropriate techniques.

At optional block 639, e.g., if the mobile device 120 determined the location of the mobile device 120 at block 638, the mobile device 120 sends location information (e.g. an LPP Provide Location Information message) to the location server 150. The location information may include position estimate determined at block 638 and may include one or more measurements received by the mobile device 120 from the base stations at stage 637.

At block 640, the location server 150 may use the measurements based on bundled PRS occasions, provided at stage 637 and/or stage 639, to determine or confirm the location of mobile device 120. For example, the location server 150 may use the known locations of the base stations 140 and the measurement information received in stage 637 and/or stage 639 to determine the location, e.g., using trilateration or other appropriate techniques.

At block 641, the base stations 140 may perform additional measurements using another set of bundled PRS occasions, which are separated in time from the first set of bundled PRS occasions measured at block 636. By way of example, the first set of bundled PRS occasions measured at block 636 and the second set of bundled PRS occasions measured at block 641 may be separated by more subframes that the number of subframes in the first set of bundled PRS occasions. The first set of bundled PRS occasions measured at block 636 and the second set of bundled PRS occasions measured at block 641 may be separated, e.g., by more than one minute.

At stage 642, similar to stage 637, the base stations 140 may provide location information (e.g. a Provide Location Information message) to the location server 150. As discussed at stage 637, the location information may include one or more measurements performed using the bundled PRS signals. Optionally, as illustrated with dotted lines, the base stations 140 may send the location information to the mobile device 120, e.g., for a mobile device based positioning procedure.

At optional block 643, e.g., if the base stations 140 sent the location information to the mobile device 120 at stage 642, the mobile device 120 may use the measurements performed by the base stations 140 using the bundled PRS occasions, e.g., RSTD measurements, any TOA measurements and the measurement times or other measurement information generated at block 641 to determine the location of mobile device 120. For example, the mobile device 120 may use the known locations of the base stations (e.g. antennas 140) for the cells (e.g. cells 145) provided in assistance data discussed at stage 633 and the measurement information generated at block 641 to determine the location, e.g., using trilateration or other appropriate techniques.

At optional block 644, e.g., if the mobile device 120 determined the location of the mobile device 120 at block 643, the mobile device 120 sends location information (e.g. an LPP Provide Location Information message) to the location server 150. The location information may include position estimate determined at block 643 and may include one or more measurements received by the mobile device 120 from the base stations at stage 637.

At block 645, similar to block 640, the location server 150 may use the measurements based on bundled PRS occasions provided by the base stations 140 at stage 642 and/or by the mobile device 120 at stage 644, to determine or confirm the location of mobile device 120.

Figure 6C:
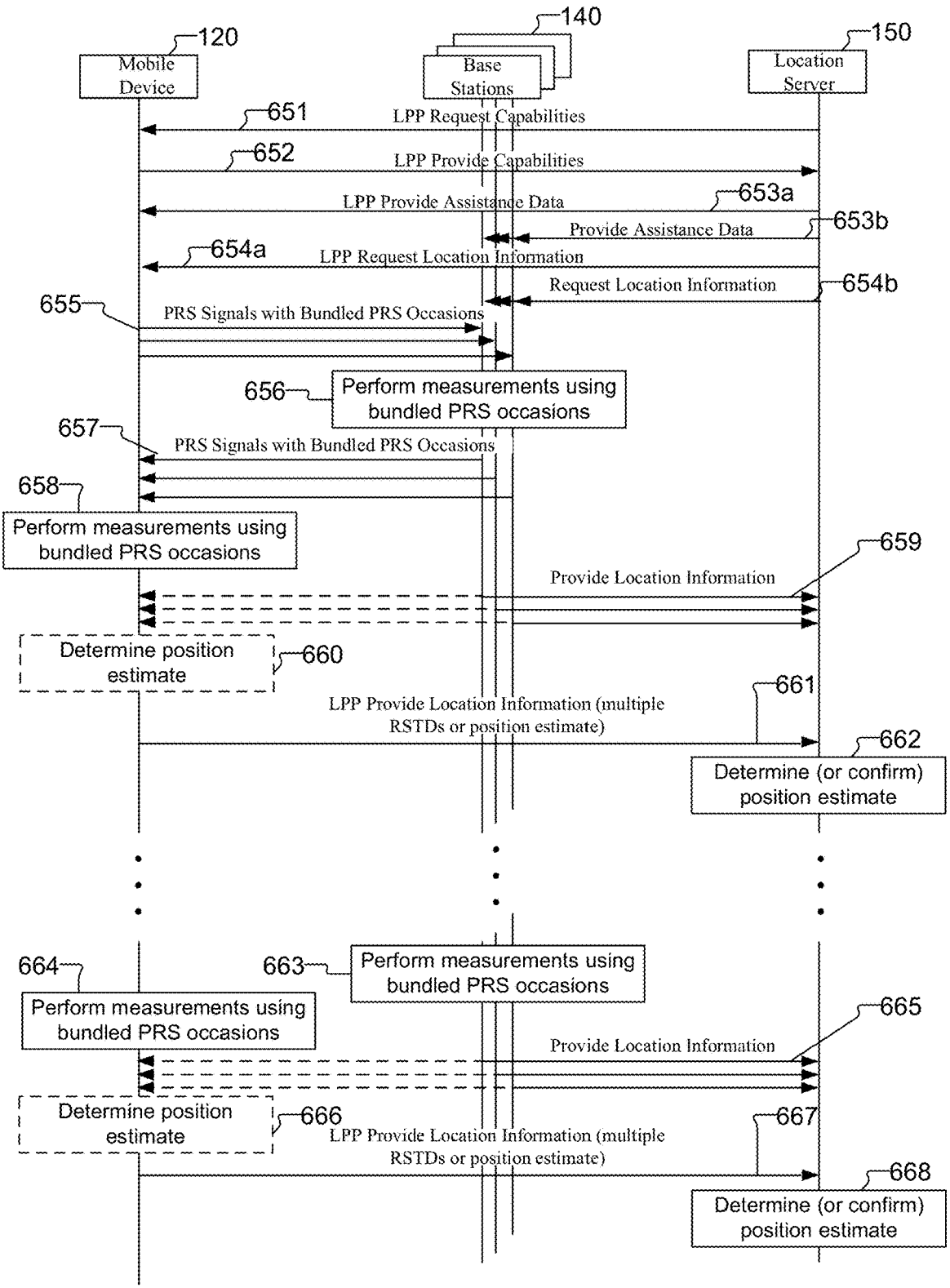
FIG. 6C illustrates exemplary message flow of a procedure that supports downlink and uplink positioning methods using bundled PRS signals in a manner consistent with disclosed embodiments.

FIG. 6C illustrates an exemplary message flow 650 of a procedure that supports position determination using a downlink and uplink based positioning method such as, e.g., RTT, in which the mobile device 120 and base stations 140 measure bundled PRS occasions for one or more measurements. In some implementations, the PRS occasions are non-narrowband PRS signals and in some implementations, the PRS occasion are narrowband PRS (NPRS) signals.

At stage 651, location server 150, which may take the form of an Enhanced Serving Mobile Location Centre (E-SMLC) or a SUPL SLP for LTE (or Location Management Function (LMF) for 5G NR), may transmit to the mobile device 120 a Request Capabilities message (e.g. an LPP Request Capabilities message) to request the positioning capabilities of mobile device 120, such as the RTT positioning capabilities of mobile device 120. In response, at stage 652, the mobile device 120 sends a Provide Capabilities message (e.g. an LPP Provide Capabilities message) to the location server 150 to provide the positioning capabilities of mobile device 120. If RTT positioning capabilities were requested in stage 651, the Provide Capabilities message may include the RTT positioning capabilities of mobile device 120 such as the RTT modes supported by mobile device 120, supported frequency bands, and support for bundled PRS occasions.

At stage 653a, the location server 150 may send a Provide Assistance Data message (e.g. an LPP Provide Assistance Data message) to the mobile device 120 with assistance data for the positioning method. The assistance data may include assistance data for the reference cell and assistance data for a number of neighbor cells. For example, the assistance data may include configuration parameters defining PRS signals transmitted by the reference cell and each neighbor cell. Similarly, at stage 653b, the location server 150 may send a Provide Assistance Data message (e.g. an Provide Assistance Data message) to the base stations 140 with assistance data for the positioning method. The assistance data may include configuration parameters defining PRS signals transmitted by the mobile device 120.

At stage 654a, the location server 150 sends a Request Location Information message (e.g. an LPP Request Location Information message) to the mobile device 120 to request measurements for positioning. This message may include information elements such as the location information type required (e.g. indicating measurements or a location estimate), a desired accuracy of a location estimate, and a response time interval (also referred to herein as a reporting time interval). Similarly, at stage 654b, the location server 150 may send a Request Location Information message (e.g. an Request Location Information message) to the base stations 140 to request measurements for positioning. This message may include information elements such as the location information type required (e.g. indicating measurements or a location estimate), a desired accuracy of a location estimate, and a response time interval (also referred to herein as a reporting time interval).

At stage 655, the mobile device 120 commences to transmit the UL PRS signals with bundled PRS occasions as discussed in FIGS. 5A and 5B. The mobile device 120 may delay transmissions of bundled PRS occasions, e.g., by transmitting one or more subframes of non-PRS occasions or entering idle mode between bundled PRS occasions. No position sounding referencing signal occasions are transmitted between bundled PRS occasions.

At block 656, the base stations 140 receive the UL PRS signals and obtain the desired measurements, e.g., UL Receive Time-Transmission Time (Rx-Tx) measurements, of the UL PRS using bundled PRS occasions.

At stage 657, the base stations 140 transmit PRS signals with bundled PRS occasions as discussed in FIGS. 5A and 5B. The base station transmits 140 transmits one or more subframes of non-position referencing signal occasions between bundled PRS occasions, wherein one or more subframes of non-position referencing signal occasions are transmitted between the bundled PRS occasions and no position referencing signal occasions are transmitted between the bundled PRS occasions. The PRS signals transmitted by the base stations 140 in stage 657 and the PRS signals transmitted by the mobile device in stage 655 may be transmitted at the same time, e.g., in frequency division duplex (FDD), or are interleaved and do not overlap in time, e.g., in time division duplex (TDD). If desired, stage 657 and stage 658 may occur before stage 655 and stage 656.

At block 658, the mobile device 120 performs the measurements on the PRS signals using bundled PRS occasions. For example, the mobile device 120 may measure the RTT to each base station 140 based on the time of transmission of UL PRS signals at stage 655 and time of receiving DL PRS signals at stage 657. Alternatively, the mobile device 120 may measure DL Rx-Tx of the received DL PRS signals.

At stage 659, the base stations 140 may send location information (e.g. a Provide Location Information message) to the location server 150. Alternatively, as shown with dotted lines, the base stations 140 may send location information to the mobile device 120. The location information may include one or more measurements, e.g., UL Rx-Tx measurements, performed by each base station 140 using the bundled PRS signals at block 656. If desired, neighbor base stations 140 may send the location information to a serving base station and the serving base station may transmit the information to the location server 150 or mobile device 120.

At block 660, the mobile device 120 may use the measurements based on bundled PRS occasions, e.g., RTT measurements generated at block 658 or DL Rx-Tx and UL Rx-Tx measurements generated by the mobile device 120 and received from the base stations 140 at block 658 and stage 659, to determine the location of mobile device 120, e.g., in a mobile device based positioning procedure. For example, the mobile device 120 may use the known locations of the base stations 140 received in the assistance data 653, the measurements by the mobile device 120 at block 658, as well as the measurement information received in stage 659 to determine the location, e.g., using trilateration or other appropriate techniques.

At stage 661 the mobile device 120 sends location information (e.g. an LPP Provide Location Information message) to the location server 150. The location information may include one or more measurements performed using the bundled PRS signals for each of one or cells. For example, the location information may include the RTT measurements for each cell. The Provide Location Information message may alternatively include the DL Rx-Tx measurements. In another implementation, the location information provided at stage 661 may include the estimate of the location of the mobile device 120 determined by the mobile device 120 at block 660.

At block 662, the location server 150 may use the measurements based on bundled PRS occasions, e.g., RTT measurements provided by the mobile device 120 at stage 661 or DL Rx-Tx and UL Rx-Tx measurements provided by the mobile device 120 and base stations 140 at stages 659 and 661, to determine the location of mobile device 120 or, optionally, to confirm a position estimate provided by the mobile device 120 at stage 661. For example, the location server 150 may use the known locations of the base stations 140 measured by the mobile device 120 at block 658 as well as the measurement information received in stage 659 and stage 661 to determine the location, e.g., using trilateration or other appropriate techniques.

At block 663, the base stations 140 may perform additional measurements, e.g., UL Rx-Tx, using another set of bundled PRS occasions, which are separated in time from the first set of bundled PRS occasions measured at block 656.

At block 664, the mobile device 120 may perform additional measurements, e.g., RTT or DL Rx-Tx, using another set of bundled PRS occasions, which are separated in time from the first set of bundled PRS occasions measured at block 658. By way of example, the first set of bundled PRS occasions measured at block 658 and the second set of bundled PRS occasions measured at block 664 may be separated by more subframes that the number of subframes in the first set of bundled PRS occasions. The first set of bundled PRS occasions measured at block 658 and the second set of bundled PRS occasions measured at block 664 may be separated, e.g., by more than one minute. The delay between transmission of the first set of bundled PRS occasions and the second set of bundled PRS occasions may be due to, e.g., the mobile device 120 transmitting one or more subframes of non-position sounding referencing signal occasions, e.g., data or other non-positioning information or the mobile device 120 entering an idle mode. At stage 665, the base stations 140 may provide location information (e.g. a Provide Location Information message) to the location server 150. Alternatively, as shown with dotted lines, the base stations 140 may send location information to the mobile device 120. The location information may include one or more measurements, e.g., UL Rx-Tx measurements, performed by each base station 140 using the bundled PRS signals at block 663.

At block 666, the mobile device 120 may use the measurements based on bundled PRS occasions, e.g., RTT measurements generated at block 664 or DL Rx-Tx and UL Rx-Tx measurements generated by the mobile device 120 and received from the base stations 140 at block 664 and stage 665, to determine the location of mobile device 120, e.g., in a mobile device based positioning procedure. For example, the mobile device 120 may use the known locations of the base stations 140 received in the assistance data 653, the measurements by the mobile device 120 at block 664, as well as the measurement information received in stage 665 to determine the location, e.g., using trilateration or other appropriate techniques.

At stage 667, similar to stage 659, the mobile device 120 may provide location information (e.g. an LPP Provide Location Information message) to the location server 150. As discussed at stage 659, the location information may include one or more measurements performed using the bundled PRS signals or an estimate of the location of the mobile device 120 determined by the mobile device 120 based on measurements performed using the bundled PRS signals at block 666.

At block 668, similar to block 662, the location server 150 may use the measurements based on bundled PRS occasions, e.g., RTT measurements provided by the mobile device 120 at stage 667 or DL Rx-Tx and UL Rx-Tx measurements provided by the mobile device 120 and base stations 140 at stages 667 and 665, to determine the location of mobile device 120 or, optionally, to confirm a position estimate provided by the mobile device 120 at stage 667. By determining the position of the mobile device 120 at multiple times, e.g., at blocks 662 and 668 or blocks 660 and 666, a more accurate position of the mobile device may be estimated.

Figure 7A:
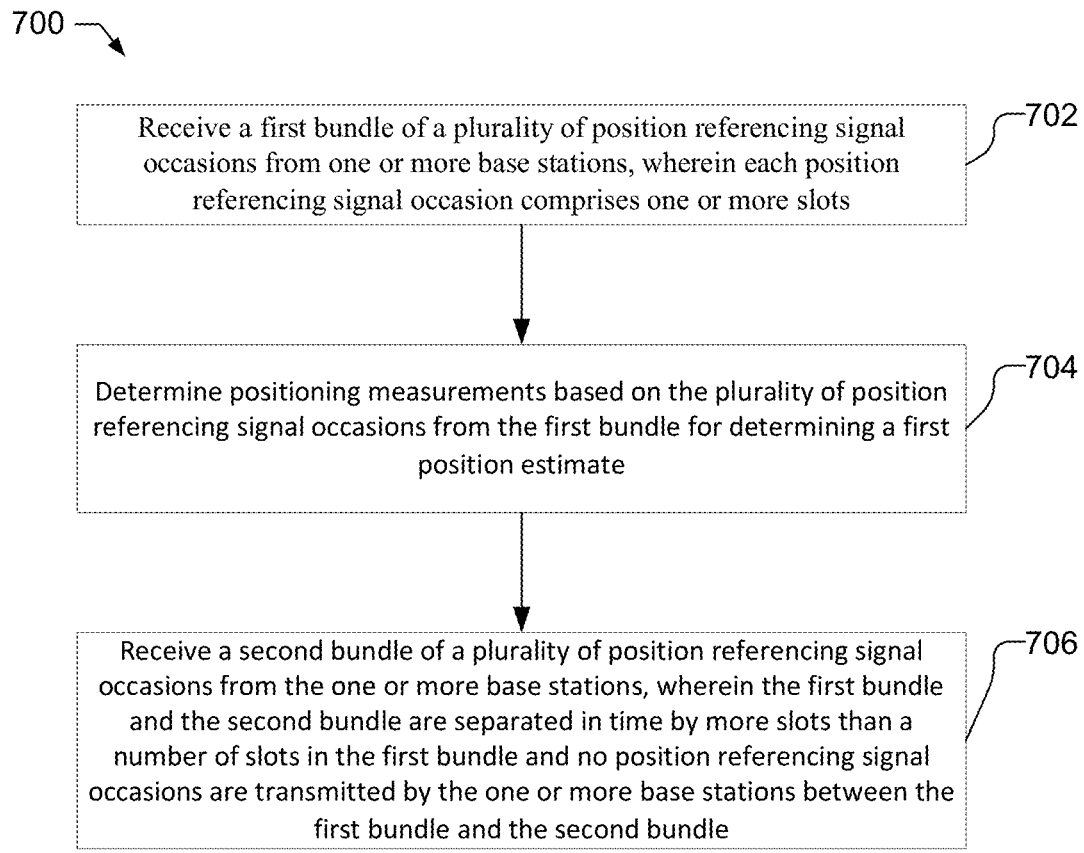
FIGS. 7A and 7B show flowcharts for exemplary methods for supporting position estimation of a mobile device performed by the mobile device in a manner consistent with disclosed embodiments.

FIG. 7A shows a flowchart for an exemplary method 700 for supporting estimating a position of a mobile device performed by the mobile device (e.g., mobile device 120) in a manner consistent with disclosed embodiments. In some implementations, the mobile device may be a narrowband Internet-of-Things (NB-IoT) mobile device measuring NPRS signals. In some implementations, the mobile device may be measuring PRS signals.

At block 702, the mobile device receives a first bundle of a plurality of position referencing signal occasions from one or more base stations, wherein each position referencing signal occasion comprises one or more slots, e.g., as illustrated at block 605 in FIG. 6A or block 657 in FIG. 6C. For example, a single base station may be used where the position is determined using Rx-Tx and angle of departure (AOD), and multiple base stations may be used for, e.g., OTDOA using RSTD or Rx-Tx. In one implementation, the position referencing signal occasions in the first bundle are separated by no more than a number of slots in each position referencing signal occasion. In one implementation, at least two of the position referencing signal occasions in the first bundle are consecutive. In one implementation, all position referencing signal occasions in the first bundle are consecutive. In some implementations, the position referencing signal occasions may comprise non-narrowband signals. In some implementations, the position referencing signal occasion may comprise narrowband signals. In some implementations, one or more position referencing signal occasions in the first bundle may be muted. In some implementations, the first bundle may comprise less than 80 consecutive position referencing signal occasions. The positioning reference signal occasions, for example may be received from the one or more base stations over one or more specific or specialized frequency bands. Moreover, the positioning reference signal occasions may be transmitted by the one or more base stations on demand, e.g., if a base station identifies multiple mobile devices requesting positioning, the positioning reference signal occasions may be dynamically scheduled.

In some implementations, assistance data may be obtained by the mobile device before receiving the first bundle of position referencing signal occasions. The assistance data, for example, may be OTDOA assistance data provided by the base station 140. The assistance data may include assistance data for the reference cell and assistance data for a number of neighbor cells. For example, the assistance data may include configuration parameters defining PRS signals transmitted by the reference cell and each neighbor cell. The PRS signals may be non-narrowband PRS signals or may be narrowband PRS (NPRS) signals.

At block 704, the mobile device may determine positioning measurements based on the plurality of position referencing signal occasions from the first bundle for determining a first position estimate, e.g., as illustrated at stage 606 or stage 610 in FIG. 6A or stage 658 or stage 661 in FIG. 6C. In one implementation, us determining positioning measurements comprises determining the first position estimate based on the plurality of position referencing signal occasions from the first bundle by the mobile device or determining the position measurements and transmitting to a location server for determining the first position estimate. In some implementations, the method may include generating a plurality of positioning measurements based on the position referencing signal occasions in the first bundle, such as Reference Signal Time Difference (RSTD) or Rx-Tx measurements. In one implementation, the position of the mobile device is estimated using a positioning method comprising one of Observed Time Difference of Arrival (OTDOA) Downlink Time Difference of Arrival (DL-TDOA), Downlink Angle of Departure (DL AoD), or Enhanced Cell ID (ECID). In some implementations, the method may include generating a plurality of positioning measurements based on the position referencing signal occasions in the first bundle, such as Reference Signal Time Difference (RSTD) or Rx-Tx measurements; and generating a position estimate of the mobile device using the plurality of positioning measurement.

At block 706, the mobile device may receive a second bundle of a plurality of position referencing signal occasions from the one or more base stations, wherein the first bundle and the second bundle are separated in time by more slots than a number of slots in the first bundle and no position referencing signal occasions are transmitted by the one or more base stations between the first bundle and the second bundle, e.g., as illustrated at block 605 and 614 in FIG. 6A or stage 657 and 664 in FIG. 6C.

In one implementation, the method may further include transmitting a third bundle of position sounding referencing signal occasions, wherein each position sounding referencing signal occasion comprises one or more slots; delaying transmission of position sounding referencing signal occasions; and transmitting a fourth bundle of position sounding referencing signal occasions, wherein each position sounding referencing signal occasion comprises one or more slots, wherein delaying the transmission of position sounding referencing signal occasions is performed between transmission of the third bundle and the fourth bundle and no position sounding referencing signal occasions are transmitted between the third bundle and the fourth bundle, e.g., as illustrated in stage 655 in FIG. 6C. In some implementations, the third bundle of position sounding referencing signal occasions is transmitted at the same time as the first bundle of the plurality of position referencing signal occasions is received from the one or more base stations. In some implementations, the third bundle of position sounding referencing signal occasions and the first bundle of the plurality of position referencing signal occasions do not overlap in time. In some implementations, the position of the mobile device is estimated using multi-cell Round Trip Time (RTT).

Figure 7B:
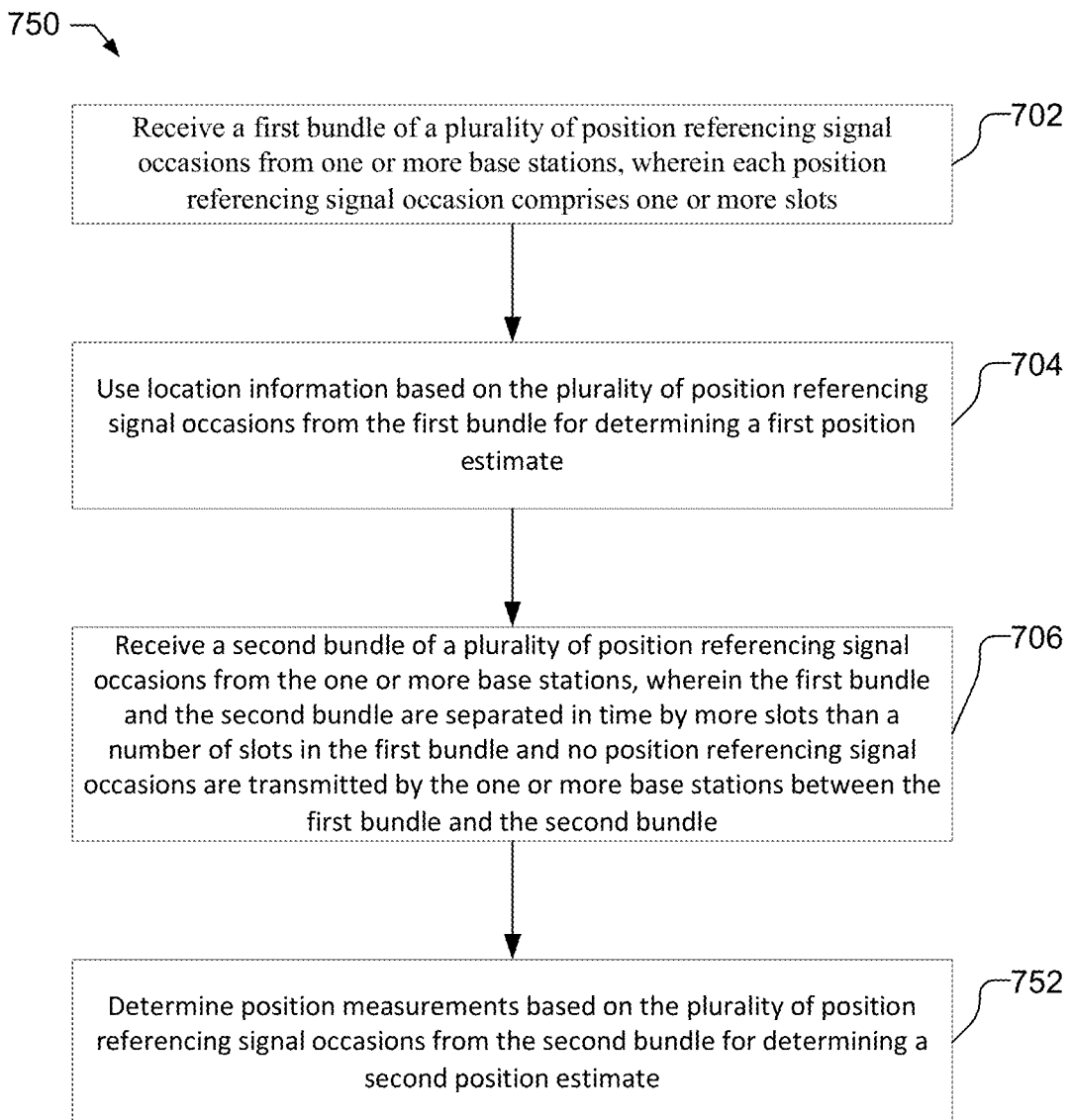

FIG. 7B shows another flowchart for an exemplary method 750 for supporting estimating a position of a mobile device performed by the mobile device (e.g., mobile device 120) in a manner consistent with disclosed embodiments. Method 750 is similar to method 700 shown in FIG. 7A, like designated elements being the same. As illustrated, method 750 additionally includes block 708 in which the mobile device may determine the position measurements based on the position referencing signal occasions of the second bundle for determining a second position estimate, e.g., as illustrated at stage 616 or stage 618 in FIG. 6A or stage 666 or stage 667 in FIG. 6C.

Figure 8:
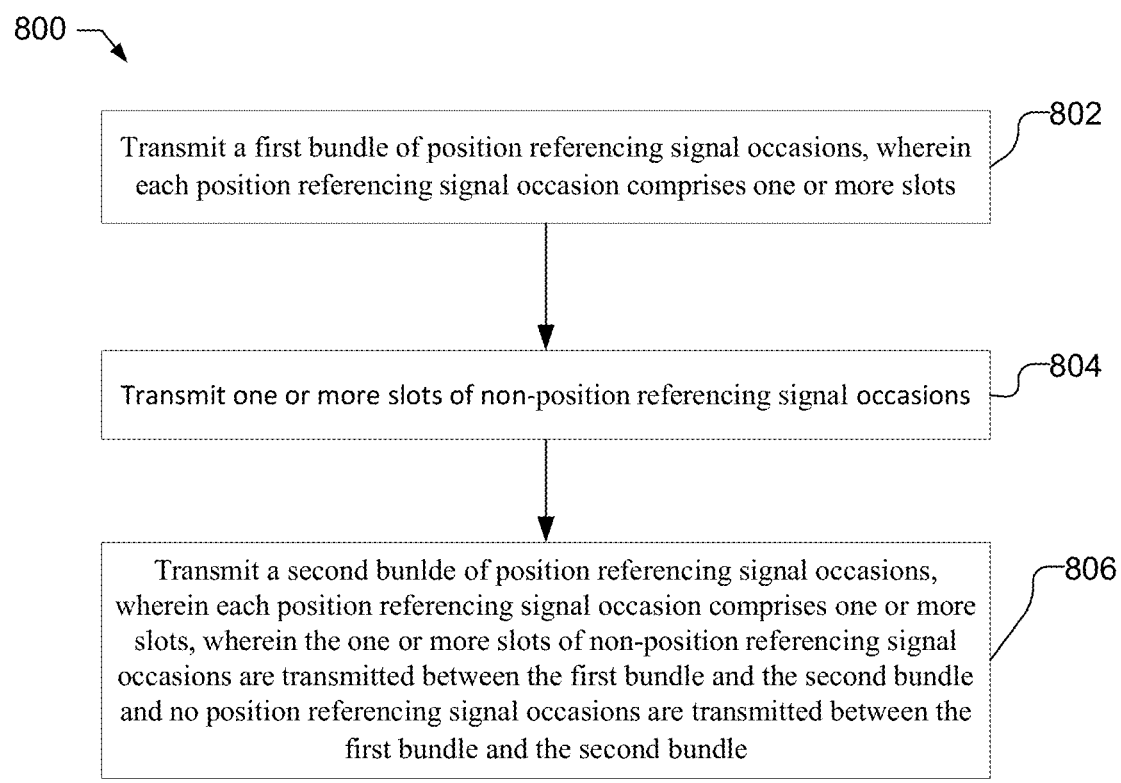
FIG. 8 shows a flowchart for an exemplary method for transmitting bundled PRS signals performed by a base station in a manner consistent with disclosed embodiments.

FIG. 8 shows a flowchart for an exemplary method 800 for transmitting bundled position referencing signal signals performed by a base station (e.g., base station 140) for supporting estimating a position of a mobile device, such as an NB-IoT device, in a manner consistent with disclosed embodiments. The base station may be, e.g., an eNodeB for LTE or gNodeB for 5G NR.

As illustrated, at block 802, the base station transmits a first bundle of position referencing signal occasions, wherein each position referencing signal occasion comprises one or more slots e.g., as illustrated at block 605 in FIG. 6A or block 657 in FIG. 6C. In some implementations, the position referencing signal occasion comprises non-narrowband signals. In some implementations, the position referencing signal occasion comprises narrowband signals. The positioning reference signal occasions, for example may be transmitted by the base station over one or more specific or specialized frequency bands. Moreover, the positioning reference signal occasions may be transmitted on demand, e.g., if the base station identifies multiple mobile devices requesting positioning, the positioning reference signal occasions may be dynamically scheduled.

At block 804, the base station transmits one or more slots of non-position referencing signal occasions, e.g., as illustrated at block 605 in FIG. 6A or block 657 in FIG. 6C. For example, the non-position referencing signal occasions may be data and/or any other non-positioning information to be used by the mobile device.

At block 806, the base station transmits a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle, e.g., as illustrated at block 605 in FIG. 6A or block 657 in FIG. 6C. The non-position referencing signal occasions between the first bundle and the second bundle comprises more slots than a number of slots in the first bundle and the base station transmits.

In one implementation, the position referencing signal occasions in the first bundle are separated by no more than a number of slots in each position referencing signal occasion. In one implementation, at least two of the position referencing signal occasions in the first bundle are consecutive. In one implementation, all position referencing signal occasions in the first bundle are consecutive. The separation between the first bundle and the second bundle may be periodic. Moreover, the separation between the first bundle and the second bundle may be greater than one minute. In some implementations, one or more position referencing signal occasions in the first bundle is muted. In some implementations, the first bundle may comprise less than 80 position referencing signal occasions.

Figure 9A:
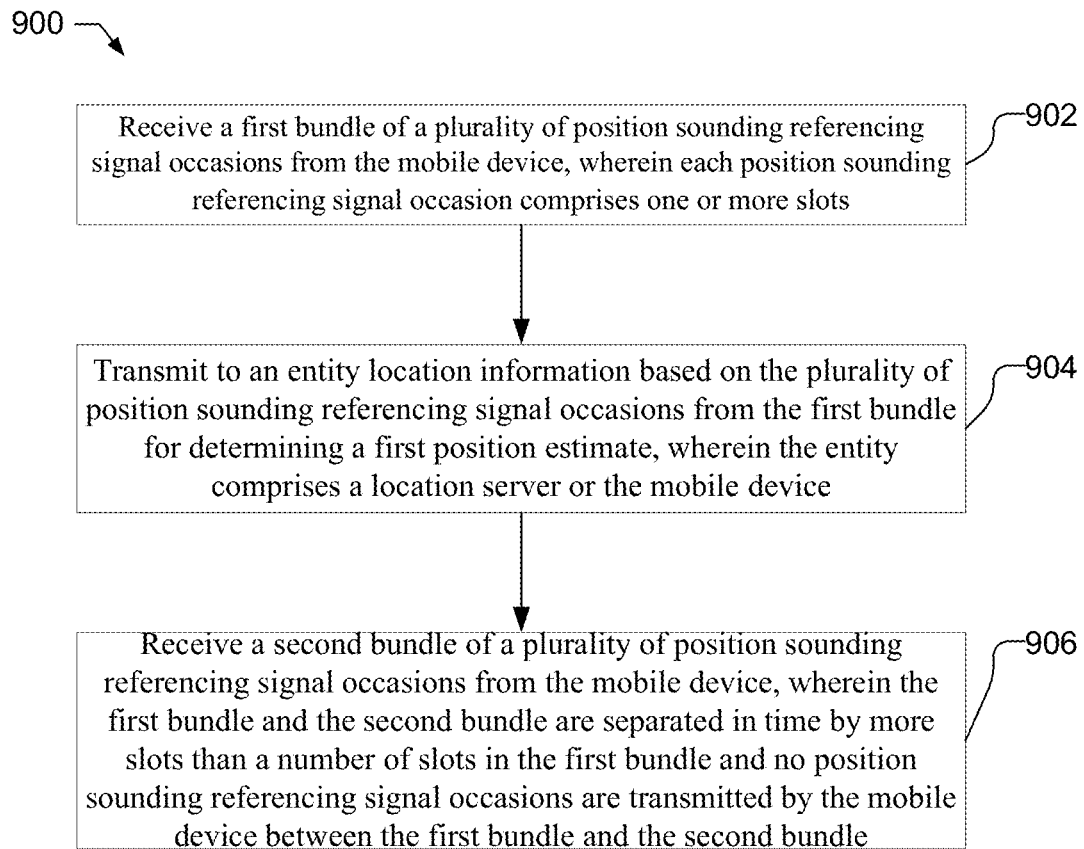
FIGS. 9A and 9B show flowcharts for exemplary methods for supporting position estimation of a mobile device performed by a base station in a manner consistent with disclosed embodiments.

FIG. 9A shows a flowchart for an exemplary method 900 for supporting estimating a position of a mobile device performed by a base station (e.g., base station 140) in a manner consistent with disclosed embodiments. In some implementations, the base station may be an evolved Node B (eNodeB) or a New Radio (NR) Node B (gNB). In some implementations, the base station may be measuring uplink PRS signals.

At block 902, the base station receives a first bundle of a plurality of position sounding referencing signal occasions from the mobile device, wherein each position sounding referencing signal occasion comprises one or more slots, e.g., as illustrated at block 635 in FIG. 6B or block 655 in FIG. 6C. In one implementation, the position sounding referencing signal occasions in the first bundle are separated by no more than a number of slots in each position referencing signal occasion. In one implementation, at least two of the position sounding referencing signal occasions in the first bundle are consecutive. In one implementation, all position sounding referencing signal occasions in the first bundle are consecutive. In some implementations, the position sounding referencing signal occasions may comprise non-narrowband signals. In some implementations, the position referencing signal occasion may comprise narrowband signals. In some implementations, one or more position sounding referencing signal occasions in the first bundle may be muted. In some implementations, the first bundle may comprise less than 80 consecutive position sounding referencing signal occasions. The position sounding reference signal occasions, for example may be received from the mobile device over one or more specific or specialized frequency bands. Moreover, the position sounding reference signal occasions may be transmitted by the mobile device on demand, e.g., the positioning reference signal occasions may be dynamically scheduled.

At block 904, the base station may transmit to an entity location information based on the plurality of position sounding referencing signal occasions from the first bundle for determining a first position estimate, wherein the entity comprises a location server or the mobile device, e.g., as illustrated at stage 637 in FIG. 6B or stages 659 in FIG. 6C. In some implementations, the method may include generating a plurality of positioning measurements based on the position sounding referencing signal occasions in the first bundle, such as Rx-Tx measurements, wherein the location information based on the plurality of position sounding referencing signal occasions from the first bundle may be the plurality of positioning measurements or information derived from the positioning measurements. In one implementation, the position of the mobile device is estimated using a positioning method comprising one of Uplink Time Difference of Arrival (UTDOA), Uplink Angle of Arrival (UL-AoA), or Uplink Relative Time of Arrival (UL-RTOA).

At block 906, the base station may receive a second bundle of a plurality of position sounding referencing signal occasions from the mobile device, wherein the first bundle and the second bundle are separated in time by more slots than a number of slots in the first bundle and no position sounding referencing signal occasions are transmitted by the mobile device between the first bundle and the second bundle, e.g., as illustrated at block 635 and 641 in FIG. 6B or stage 655 and 663 in FIG. 6C.

In one implementation, the method may further include transmitting a third bundle of position referencing signal occasions, wherein each position referencing signal occasion comprises one or more slots; transmitting one or more slots of non-position referencing signal occasions; and transmitting a fourth bundle of position referencing signal occasions, wherein each position referencing signal occasion comprises one or more slots, wherein the one or more slots of non-position referencing signal occasions are transmitted between the third bundle and the fourth bundle and no position referencing signal occasions are transmitted between the third bundle and the fourth bundle, e.g., as illustrated in stage 657 in FIG. 6C. In some implementations, the third bundle of position referencing signal occasions is transmitted at the same time as the first bundle of the plurality of position sounding referencing signal occasions is received from the mobile device. In some implementations, the third bundle of position referencing signal occasions and the first bundle of the plurality of position sounding referencing signal occasions do not overlap in time. In some implementations, the position of the mobile device is estimated using multi-cell Round Trip Time (RTT).

Figure 9B:
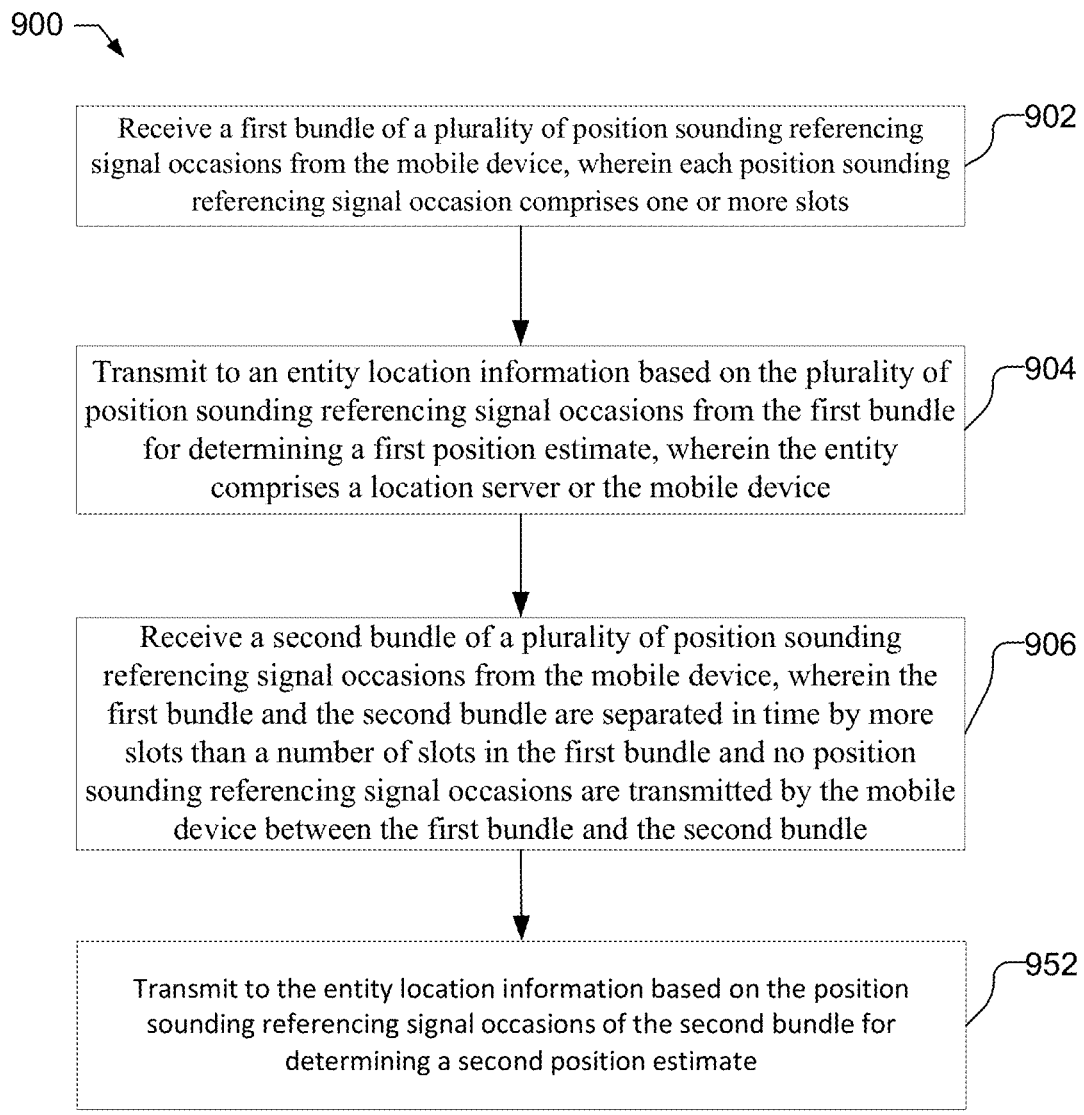

FIG. 9B shows another flowchart for an exemplary method 950 for supporting estimating a position of a mobile device performed by the base station (e.g., base station 140) in a manner consistent with disclosed embodiments. Method 950 is similar to method 900 shown in FIG. 9A, like designated elements being the same. As illustrated, method 950 additionally includes block 908 in which the base station may transmit to the entity location information based on the position sounding referencing signal occasions of the second bundle for determining a second position estimate, e.g., as illustrated at stage 642 in FIG. 6B or stage 665 or stage 665b in FIG. 6C.

Figure 10:
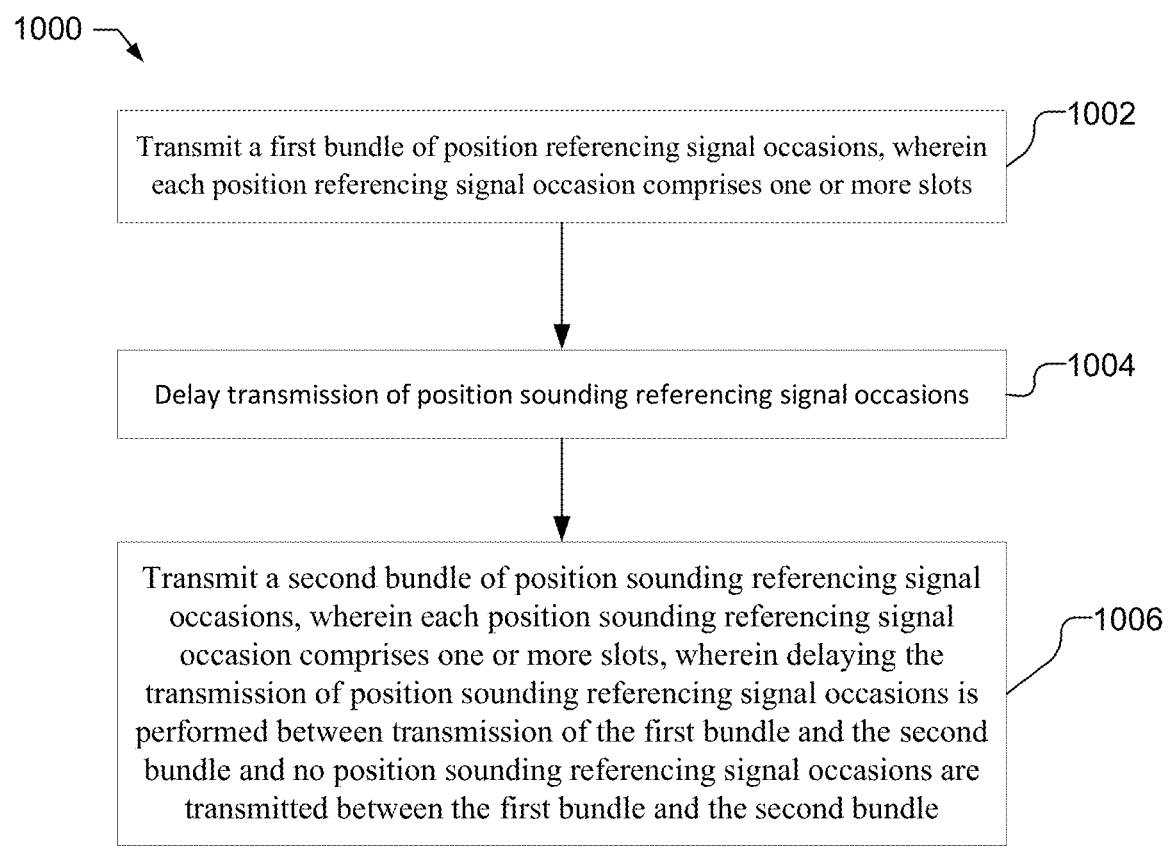
FIG. 10 shows a flowchart for an exemplary method for transmitting bundled PRS signals performed by a mobile device in a manner consistent with disclosed embodiments.

FIG. 10 shows a flowchart for an exemplary method 1000 for transmitting bundled position sounding referencing signal signals by a mobile device (e.g., mobile device 120) for supporting estimating a position of the mobile device, in a manner consistent with disclosed embodiments. The mobile device may be, e.g., a narrowband Internet-of-Things (IoT) mobile device.

As illustrated, at block 1002, the mobile device transmits a first bundle of position sounding referencing signal occasions, wherein each position sounding referencing signal occasion comprises one or more slots, e.g., as illustrated at block 635 in FIG. 6B or block 655 in FIG. 6C. In some implementations, the position referencing signal occasion comprises non-narrowband signals. In some implementations, the position referencing signal occasion comprises narrowband signals. The positioning reference signal occasions, for example may be transmitted by the mobile device over one or more specific or specialized frequency bands. Moreover, the position sounding reference signal occasions may be transmitted on demand, e.g., the position sounding reference signal occasions may be dynamically scheduled.

At block 1004, the mobile device delays transmission of position sounding referencing signal occasions, e.g., as illustrated at block 635 in FIG. 6B or block 655 in FIG. 6C. For example, delaying the transmission of position sounding referencing signal occasions may comprise transmitting one or more slots of non-position sounding referencing signal occasions or entering idle mode, wherein the non-position sounding referencing signal occasions comprises data or other non-positioning information from the mobile device. At block 1006, the mobile device transmits a second bundle of position sounding referencing signal occasions, wherein each position sounding referencing signal occasion comprises one or more slots, wherein delaying the transmission of position sounding referencing signal occasions is performed between transmission of the first bundle and the second bundle and no position sounding referencing signal occasions are transmitted between the first bundle and the second bundle, e.g., as illustrated at block 635 in FIG. 6B or block 655 in FIG. 6C. The non-position sounding referencing signal occasions between the first bundle and the second bundle comprises more slots than a number of slots in the first bundle and the base station transmits.

In one implementation, the position sounding referencing signal occasions in the first bundle are separated by no more than a number of slots in each position referencing signal occasion. In one implementation, at least two of the position sounding referencing signal occasions in the first bundle are consecutive. In one implementation, all position sounding referencing signal occasions in the first bundle are consecutive. The separation between the first bundle and the second bundle may be periodic. Moreover, the separation between the first bundle and the second bundle may be greater than one minute. In some implementations, one or more position sounding referencing signal occasions in the first bundle is muted. In some implementations, the first bundle may comprise less than 80 position referencing signal occasions.

In one implementation, the method may further include receiving a third bundle of a plurality of position referencing signal occasions from one or more base stations, wherein each position referencing signal occasion comprises one or more slots; transmitting to a location server location information based on the plurality of position referencing signal occasions from the third bundle for determining a first position estimate; and receiving a fourth bundle of a plurality of position referencing signal occasions from the one or more base stations, wherein the third bundle and the fourth bundle are separated in time by more slots than a number of slots in the third bundle and no position referencing signal occasions are transmitted by the one or more base stations between the third bundle and the fourth bundle, e.g., as illustrated in stage 657 in FIG. 6C. In some implementations, the third bundle of position referencing signal occasions is received from the one or more base stations at the same time as the first bundle of the plurality of position sounding referencing signal occasions is transmitted. In some implementations, the third bundle of position referencing signal occasions and the first bundle of the plurality of position sounding referencing signal occasions do not overlap in time. In some implementations, the position of the mobile device is estimated using multi-cell Round Trip Time (RTT).

Figure 11:
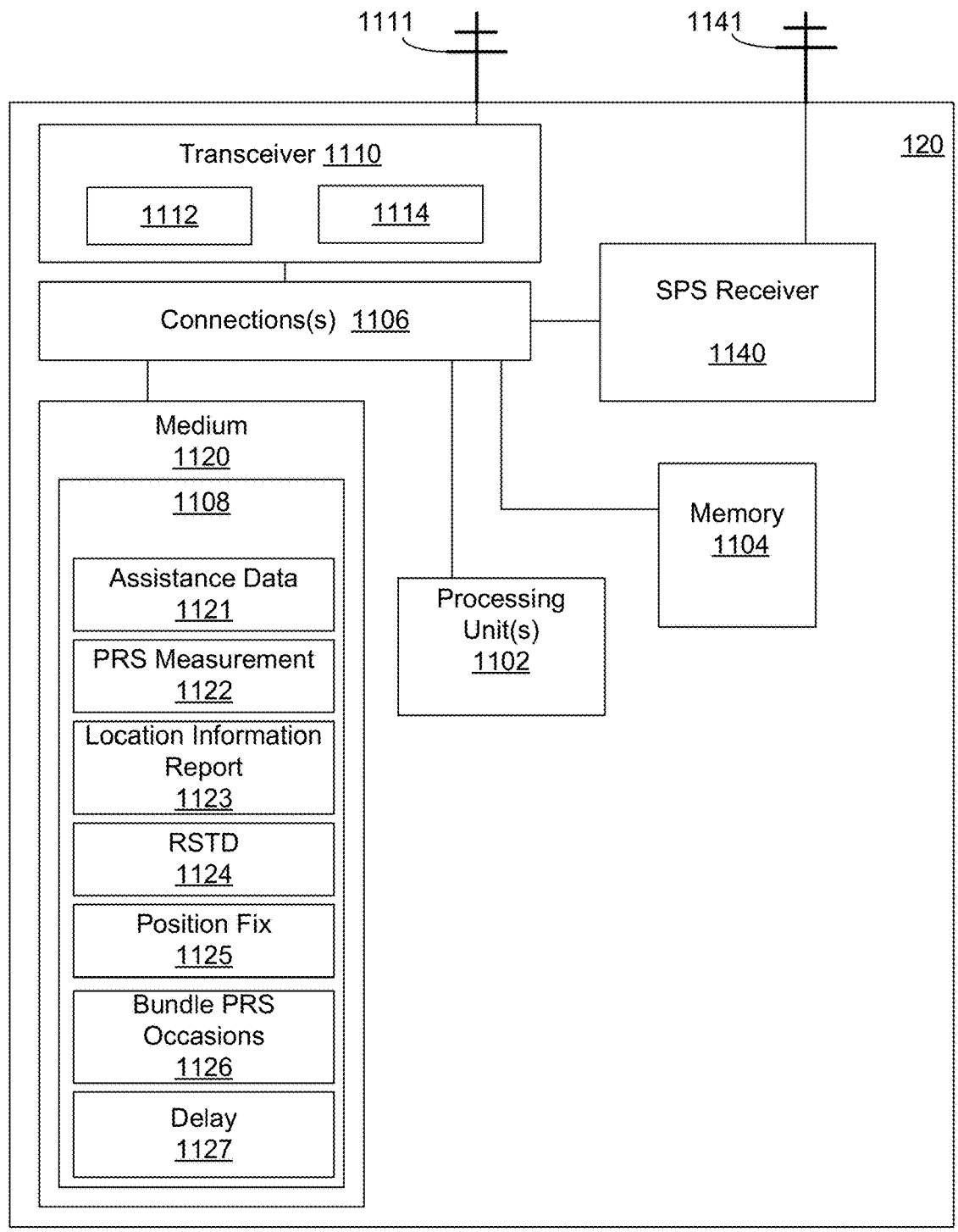
FIG. 11 shows a schematic block diagram illustrating certain exemplary features of a mobile device enabled to perform position determination using bundled PRS signals in a manner consistent with disclosed embodiments.

FIG. 11 shows a schematic block diagram illustrating certain exemplary features of mobile device 120 enabled to support OTDOA measurements using bundled position referencing signals (PRS) occasions in a manner consistent with disclosed embodiments. In some implementations, the PRS occasions are non-narrowband PRS signals and in some implementations, the PRS occasions are narrowband PRS (NPRS) signals. The mobile device 120, for example, may be, e.g., a NB-IoT device, or may be operating in a 5G network. Mobile device 120 may, for example, include one or more processors 1102, memory 1104, a transceiver 1110 (e.g., wireless network interface), and (as applicable) an SPS receiver 1140, which may be operatively coupled with one or more connections 1106 (e.g., buses, lines, fibers, links, etc.) to non-transitory computer readable medium 1120 and memory 1104. The transceiver 1110 may be a modem. The mobile device 120 may further include additional items, which are not shown, such as a user interface that may include e.g., a display, a keypad or other input device, such as virtual keypad on the display, through which a user may interface with the mobile device. In certain example implementations, all or part of mobile device 120 may take the form of a chipset, and/or the like. The SPS receiver 1140 may be enabled to receive signals associated with one or more SPS resources. Transceiver 1110 may, for example, include a transmitter 1112 enabled to transmit one or more signals over one or more types of wireless communication networks and a receiver 1114 to receive one or more signals transmitted over the one or more types of wireless communication networks.

In some embodiments, mobile device 120 may include antennas 1111 and 1141, which may be internal or external. Mobile device antennas 1111 and 1141 may be used to transmit and/or receive signals processed by transceiver 1110 and SPS receiver 1140, respectively. In some embodiments, mobile device antennas 1111, and 1141 may be coupled to transceiver 1110 and SPS receiver 1140. In some embodiments, measurements of signals received (transmitted) by mobile device 120 may be performed at the point of connection of the mobile device antenna 1111 and transceiver 1110. For example, the measurement point of reference for received (transmitted) RF signal measurements may be an input (output) terminal of the receiver 1114 (transmitter 1112) and an output (input) terminal of the mobile device antennas 1111. In a mobile device 120 with multiple mobile device antennas 1111 or antenna arrays, the antenna connector may be viewed as a virtual point representing the aggregate output (input) of multiple mobile device antennas. In some embodiments, mobile device 120 may measure received signals including signal strength and TOA measurements and the raw measurements may be processed by the one or more processors 1102. In some embodiments, the antennas 1111 and 1141 may be combined.

The one or more processors 1102 may be implemented using a combination of hardware, firmware, and software.

For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of mobile device 120.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in mobile device 120, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in mobile device 120 is merely exemplary, and as such the functionality of the modules and/or data structures may be combined, separated, and/or be structured in different ways depending upon the implementation of the mobile device 120.

The medium 1120 and/or memory 1104 may include an assistance data unit 1121 that when implemented by the one or more processors 1102 configures the one or more processors 1102 to obtain assistance data for estimating the position of the mobile device, e.g., via transceiver 1110. The assistance data, for example, may be OTDOA assistance data provided by the base station 140. The assistance data may include assistance data for the reference cell and assistance data for a number of neighbor cells. For example, the assistance data may include configuration parameters defining PRS signals transmitted by the reference cell and each neighbor cell.

The medium 1120 and/or memory 1104 may include a PRS measurement unit 1122 that when implemented by the one or more processors 1102 configures the one or more processors 1102 to perform positioning measurements from a plurality of bundled PRS occasions, e.g., one or more of the PRS occasions are consecutive, received from a base station e.g., via transceiver 1110. For example, the PRS measurements may be time of arrival (TOA) measurements of signals from the reference cell and one or more neighbor cells or may be DL Time Difference of Arrival (DL-TDOA), DL Angle of Departure (DL AoD), Enhanced Cell ID (ECID), or Rx-Tx measurements.

The medium 1120 and/or memory 1104 may include a location information report unit 1123 that when implemented by the one or more processors 1102 configures the one or more processors 1102 to transmit to a location server location information from the plurality of positioning measurements, e.g., via transceiver 1110. For example, the location information may be information based on the measurements made by the mobile device 120, such as the measurements themselves or a Reference Signal Time Difference (RSTD) based on the measurements (e.g., generated by the one or more processors 1102 configured by an RSTD unit 1124). The location information may additionally or alternatively be a position estimate (e.g., generated by the one or more processors 1102 configured by a position fix unit 1125). In some implementations, the modem 1110 may determine the position measurements, and the application processor or sensor core, e.g., in processing unit 1102 may determine the position estimation based on the position measurements. In another implementation, the modem 1110 may determine the position estimate.

The medium 1120 and/or memory 1104 may further include bundle PRS occasions unit 1126 and a delay unit 1127 that when implemented by the one or more processors 1102 configures the one or more processors 1102 to transmit bundles of position sounding referencing signal occasions with a delay between bundles.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support OTDOA measurements in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by at least one processors 1102 may be operatively enabled to perform all or portions of the example operations as described herein. Computer readable medium 1120 may be a part of memory 1104.

Thus, mobile device 120 capable of supporting estimating a position of the mobile device may include a means for receiving a first bundle of a plurality of position referencing signal occasions from one or more base stations, wherein each position referencing signal occasion comprises one or more slots, which may be, e.g., the transceiver 1110 and one or more processors 1102 with dedicated hardware or implementing executable code or software instructions in memory 1104 such as the PRS measurement unit 1122. A means for determining position measurements based on the plurality of position referencing signal occasions from the first bundle for determining a first position estimate may be, e.g., the transceiver 1110 and one or more processors 1102 with dedicated hardware or implementing executable code or software instructions in memory 1104 such as the location information report unit 1123 or position fix unit 1125. A means for receiving a second bundle of a plurality of position referencing signal occasions from the one or more base stations, wherein the first bundle and the second bundle are separated in time by more slots than a number of slots in the first bundle and no position referencing signal occasions are transmitted by the one or more base stations between the first bundle and the second bundle may be, e.g., transceiver 1110 and one or more processors 1102 with dedicated hardware or implementing executable code or software instructions in memory 1104 such as the PRS measurement unit 1122.

In one implementation, the means for determining the position measurements may comprise means for determining the first position estimate based on the plurality of position referencing signal occasions from the first bundle by the mobile device or determining the position measurements and transmitting the positioning measurements to a location server for determining the first position estimate, which may be, e.g., the transceiver 1110 and one or more processors 1102 with dedicated hardware or implementing executable code or software instructions in memory 1104 such as the position fix unit 1125 or the location information report unit 1123.

In one implementation, the mobile device may further include a means for determining positioning measurements based on the position referencing signal occasions of the second bundle for determining a second position estimate, which may be, e.g., the transceiver 1110 and one or more processors 1102 with dedicated hardware or implementing executable code or software instructions in memory 1104 such as the location information report unit 1123 or position fix unit 1125.

In one implementation, the mobile device may further include a means for generating a plurality of positioning measurements based on the position referencing signal occasions in the first bundle, which may be, e.g., the one or more processors 1102 with dedicated hardware or implementing executable code or software instructions in memory 1104 such as the RSTD unit 1124.

In one implementation, the mobile device may further include a means for generating a plurality of positioning measurements based on the position referencing signal occasions in the first bundle, which may be, e.g., the one or more processors 1102 with dedicated hardware or implementing executable code or software instructions in memory 1104 such as the RSTD unit 1124. A means for generating a position estimate of the mobile device using the plurality of positioning measurements may be, e.g., the one or more processors 1102 with dedicated hardware or implementing executable code or software instructions in memory 1104 such as the position fix unit 1125.

In one implementation, the mobile device may further include a means for transmitting a third bundle of position sounding referencing signal occasions, wherein each position sounding referencing signal occasion comprises one or more slots, which may be, e.g., the transceiver 1110 and one or more processors 1102 with dedicated hardware or implementing executable code or software instructions in memory 1104 such as the bundle PRS occasions unit 1126. A means for delaying transmission of position sounding referencing signal occasions may be, e.g., the one or more processors 1102 with dedicated hardware or implementing executable code or software instructions in memory 1104 such as the delay unit 1127. A means for transmitting a fourth bundle of position sounding referencing signal occasions, wherein each position sounding referencing signal occasion comprises one or more slots, wherein delaying the transmission of position sounding referencing signal occasions is performed between transmission of the third bundle and the fourth bundle and no position sounding referencing signal occasions are transmitted between the third bundle and the fourth bundle, may be, e.g., the transceiver 1110 and one or more processors 1102 with dedicated hardware or implementing executable code or software instructions in memory 1104 such as the bundle PRS occasions unit 1126.

Mobile device capable of transmitting bundled position sounding referencing signal signals by a mobile device for supporting estimating a position of the mobile device may include means for transmitting a first bundle of position sounding referencing signal occasions, wherein each position sounding referencing signal occasion comprises one or more slots, which may be, e.g., the transceiver 1110 and one or more processors 1102 with dedicated hardware or implementing executable code or software instructions in memory 1104 such as the bundle PRS occasions unit 1126. A means for delaying transmission of position sounding referencing signal occasions may be, e.g., the one or more processors 1102 with dedicated hardware or implementing executable code or software instructions in memory 1104 such as the delay unit 1127. A means for transmitting a second bundle of position sounding referencing signal occasions, wherein each position sounding referencing signal occasion comprises one or more slots, wherein delaying the transmission of position sounding referencing signal occasions is performed between transmission of the first bundle and the second bundle and no position sounding referencing signal occasions are transmitted between the first bundle and the second bundle may be, e.g., the transceiver 1110 and one or more processors 1102 with dedicated hardware or implementing executable code or software instructions in memory 1104 such as the bundle PRS occasions unit 1126.

The mobile device may further include a means for receiving a third bundle of a plurality of position referencing signal occasions from one or more base stations, wherein each position referencing signal occasion comprises one or more slots, which may be, e.g., the transceiver 1110 and one or more processors 1102 with dedicated hardware or implementing executable code or software instructions in memory 1104 such as the PRS measurement unit 1122. A means for transmitting to a location server location information based on the plurality of position referencing signal occasions from the third bundle for determining a first position estimate may be, e.g., the transceiver 1110 and one or more processors 1102 with dedicated hardware or implementing executable code or software instructions in memory 1104 such as the location information report unit 1123. A means for receiving a fourth bundle of a plurality of position referencing signal occasions from the one or more base stations, wherein the third bundle and the fourth bundle are separated in time by more slots than a number of slots in the third bundle and no position referencing signal occasions are transmitted by the one or more base stations between the third bundle and the fourth bundle may be, e.g., the transceiver 1110 and one or more processors 1102 with dedicated hardware or implementing executable code or software instructions in memory 1104 such as the PRS measurement unit 1122.

Figure 12:
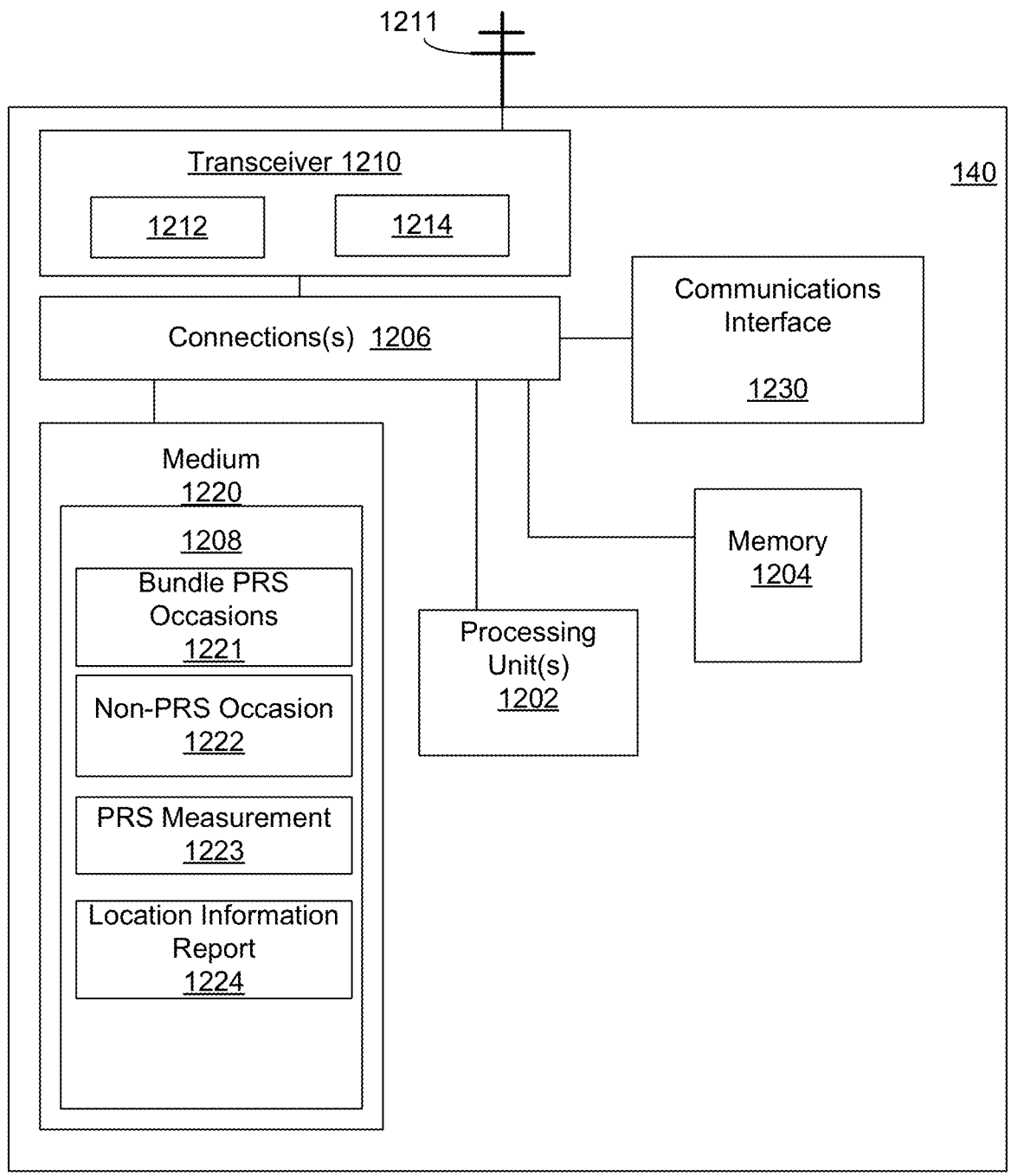
FIG. 12 shows a schematic block diagram illustrating a base station enabled to perform position determination by transmitting bundled PRS signals for a mobile device in a manner consistent with disclosed embodiments.

FIG. 12 is a schematic block diagram illustrating a base station 140 enabled to support OTDOA measurements by transmitting bundled position referencing signals (PRS) occasions in a manner consistent with disclosed embodiments. In some implementations, the PRS occasions are non-narrowband PRS signals and in some implementations, the PRS occasions are narrowband PRS (NPRS) signals. In some embodiments, base station 140 may be an eNodeB for a LTE network or a gNodeB for a 5G NR network. In some embodiments, base station 140 may include, for example, one or more processors 1202, memory 1204, a transceiver 1210 (e.g., wireless network interface), and (as applicable) communications interface 1280 (e.g., wireline or wireless network interface), which may be operatively coupled with one or more connections 1206 (e.g., buses, lines, fibers, links, etc.) to non-transitory computer readable medium 1220 and memory 1204. In certain example implementations, some portion of base station 140 may take the form of a chipset, and/or the like.

Transceiver 1210 may, for example, include a transmitter 1212 enabled to transmit one or more signals over one or more types of wireless communication networks and a receiver 1214 to receive one or more signals transmitted over the one or more types of wireless communication networks. Base station 140 may include antenna 1211 to transmit and/or receive signals processed by transceiver 1210.

Communications interface 1230 may include a variety of wired and wireless connections that support wired transmission and/or reception and, if desired, may additionally or alternatively support transmission and reception of one or more signals over one or more types of wireless communication networks. Communications interface 1290 may also include interfaces for communication with various other computers and peripherals. For example, in one embodiment, communications interface 1230 may comprise network interface cards, input-output cards, chips and/or ASICs that implement one or more of the communication functions performed by base station 140. In some embodiments, communications interface 1230 may also interface with network 130 to obtain a variety of network configuration related information, such as PCIs, configured PRS information, and/or timing information used by the base stations in the network.

The one or more processors 1202 may be implemented using a combination of hardware, firmware, and software. For example, one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of base station 140.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in base station 140, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors.

A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in mobile device 122 is merely exemplary, and as such the functionality of the modules and/or data structures may be combined, separated, and/or be structured in different ways depending upon the implementation of the base station 140.

The medium 1220 and/or memory 1204 may include a bundle PRS occasion unit 1221 that when implemented by the one or more processors 1202 configures the one or more processors 1202 to cause the transceiver 1210 to transmit plurality of consecutive narrowband position referencing signals (PRS) occasions, wherein each PRS occasion comprises one or more slots.

The medium 1220 and/or memory 1204 may include a non-PRS occasion unit 1222 that when implemented by the one or more processors 1202 configures the one or more processors 1202 to cause the transceiver 1210 to transmit non-PRS occasions may be data and/or any other information, e.g., between PRS occasions within a bundle, or between bundles of PRS occasions.

The medium 1220 and/or memory 1204 may include a PRS measurement unit 1223 that when implemented by the one or more processors 1202 configures the one or more processors 1202 to perform positioning measurements from a plurality of bundled plurality of position sounding referencing signal occasions from the mobile device via transceiver 1210. For example, the PRS measurements may be UTDOA, UL-AoA, UL-RTOA, or Rx-Tx measurements.

The medium 1220 and/or memory 1204 may include a location information report unit 1224 that when implemented by the one or more processors 1202 configures the one or more processors 1202 to transmit, e.g., via transceiver 1210 location information from the plurality of positioning measurements to an entity, such as a location server or the mobile device.

The methodologies described herein in flow charts and message flows may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software may be stored in medium 1220, which may support the use of non-transitory computer readable medium 1220, including removable media. Program code may be resident on non-transitory computer readable medium 1220 or memory 1204 and may be read and executed by the one or more processors 1202. Memory may be implemented within the one or more processors 1202 or external to the one or more processors 1202. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer readable medium 1220 and/or memory 1204. Examples include computer readable media encoded with a data structure and computer readable media encoded with a computer program. For example, non-transitory computer readable medium 1220 including program code stored thereon may include program code to support OTDOA measurement using OTDOA assistance information in a manner consistent with disclosed embodiments.

Non-transitory computer readable media includes a variety of physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer readable media.

In addition to storage on computer readable medium, instructions and/or data may be provided as signals on transmission media to communications interface 1230, which may store the instructions/data in memory 1204, medium 1220 and/or relayed the instructions/data to the one or more processors 1202 for execution. For example, communications interface 1230 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, non-volatile RAM, etc. While illustrated in this example as being separate from the one or more processors 1202, it should be understood that all or part of a primary memory may be provided within or otherwise co-located/coupled with the one or more processors 1202. Secondary memory may include, for example, the same or similar type of memory as primary memory and/or medium 1220 such as, for example, hard disk drives, optical disc drives, tape drives, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a removable media drive that may include non-transitory computer readable medium 1220 with computer implementable instructions stored thereon, which if executed by at least one processors 1202 may be operatively enabled to perform all or portions of the example operations as described herein. Computer readable medium 1220 may be a part of memory 1204.

Thus, the base station 140 may be capable of transmitting bundled position referencing signal signals for supporting estimating a position of a mobile device may include a means for transmitting a first bundle of position referencing signal occasions, wherein each position referencing signal occasion comprises one or more slots, which may be, e.g., the transceiver 1210 and one or more processors 1202 with dedicated hardware or implementing executable code or software instructions in memory 1204 such as the bundle PRS occasions unit 1221. A means for transmitting one or more slots of non-position referencing signal occasions may be, e.g., the transceiver 1210 and one or more processors 1202 with dedicated hardware or implementing executable code or software instructions in memory 1204 such as the non-PRS occasion unit 1222. A means for transmitting a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle, may be, e.g., the transceiver 1210 and one or more processors 1202 with dedicated hardware or implementing executable code or software instructions in memory 1204 such as the bundle PRS occasions unit 1221.

The base station may further include means for receiving a third bundle of a plurality of position sounding referencing signal occasions from the mobile device, wherein each position sounding referencing signal occasion comprises one or more slots, which may be, e.g., the transceiver 1210 and one or more processors 1202 with dedicated hardware or implementing executable code or software instructions in memory 1204 such as the PRS measurement unit 1223. A means for transmitting to an entity location information based on the plurality of position sounding referencing signal occasions from the third bundle for determining a first position estimate, wherein the entity comprises a location server or the mobile device may be, e.g., the transceiver 1210 and one or more processors 1202 with dedicated hardware or implementing executable code or software instructions in memory 1204 such as the location information report unit 1224. A means for receiving a fourth bundle of a plurality of position sounding referencing signal occasions from the mobile device, wherein the third bundle and the fourth bundle are separated in time by more slots than a number of slots in the third bundle and no position sounding referencing signal occasions are transmitted by the mobile device between the third bundle and the fourth bundle may be, e.g., the transceiver 1210 and one or more processors 1202 with dedicated hardware or implementing executable code or software instructions in memory 1204 such as the PRS measurement unit 1223.

The base station 140 capable of supporting estimating a position of a mobile device performed by a base station may include a means for receiving a first bundle of a plurality of position sounding referencing signal occasions from the mobile device, wherein each position sounding referencing signal occasion comprises one or more slots which may be, e.g., the transceiver 1210 and one or more processors 1202 with dedicated hardware or implementing executable code or software instructions in memory 1204 such as the PRS measurement unit 1223. A means for transmitting to an entity location information based on the plurality of position sounding referencing signal occasions from the first bundle for determining a first position estimate, wherein the entity comprises a location server or the mobile device may be, e.g., the transceiver 1210 and one or more processors 1202 with dedicated hardware or implementing executable code or software instructions in memory 1204 such as the location information report unit 1224. A means for receiving a second bundle of a plurality of position sounding referencing signal occasions from the mobile device, wherein the first bundle and the second bundle are separated in time by more slots than a number of slots in the first bundle and no position sounding referencing signal occasions are transmitted by the mobile device between the first bundle and the second bundle may be, e.g., the transceiver 1210 and one or more processors 1202 with dedicated hardware or implementing executable code or software instructions in memory 1204 such as the PRS measurement unit 1223.

The base station 140 may further include a means for transmitting to the entity location information based on the position sounding referencing signal occasions of the second bundle for determining a second position estimate, which may be, e.g., the transceiver 1210 and one or more processors 1202 with dedicated hardware or implementing executable code or software instructions in memory 1204 such as the location information report unit 1224.

The base station 140 may further include a means for generating a plurality of positioning measurements based on the position sounding referencing signal occasions in the first bundle, wherein the location information based on the plurality of position sounding referencing signal occasions from the first bundle comprises the plurality of positioning measurements, which may be, e.g., the transceiver 1210 and one or more processors 1202 with dedicated hardware or implementing executable code or software instructions in memory 1204 such as the PRS measurement unit 1223.

The base station 140 may further include a means for transmitting a third bundle of position referencing signal occasions, wherein each position referencing signal occasion comprises one or more slots, which may be, e.g., the transceiver 1210 and one or more processors 1202 with dedicated hardware or implementing executable code or software instructions in memory 1204 such as the bundle PRS occasions unit 1221. A means for transmitting one or more slots of non-position referencing signal occasions may be, e.g., the transceiver 1210 and one or more processors 1202 with dedicated hardware or implementing executable code or software instructions in memory 1204 such as the non-PRS occasions unit 1222. A means for transmitting a fourth bundle of position referencing signal occasions, wherein each position referencing signal occasion comprises one or more slots, wherein the one or more slots of non-position referencing signal occasions are transmitted between the third bundle and the fourth bundle and no position referencing signal occasions are transmitted between the third bundle and the fourth bundle may be, e.g., the transceiver 1210 and one or more processors 1202 with dedicated hardware or implementing executable code or software instructions in memory 1204 such as the bundle PRS occasions unit 1221.

One implementation (1) may be a method of transmitting bundled position referencing signal signals by a base station for supporting estimating a position of a mobile device, comprising: transmitting a first bundle of position referencing signal occasions, wherein each position referencing signal occasion comprises one or more slots; transmitting one or more slots of non-position referencing signal occasions; and transmitting a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle.

There may be some implementations (2) of the above-described method (1) wherein the non-position referencing signal occasions comprises data or other non-positioning information to be used by the mobile device.

There may be some implementations (3) of the above-described method (1) the non-position referencing signal occasions between the first bundle and the second bundle comprises more slots than a number of slots in the first bundle.

There may be some implementations (4) of the above-described method (1) wherein separation between the first bundle and the second bundle may be periodic.

There may be some implementations (5) of the above-described method (1) wherein the separation between the first bundle and the second bundle may be greater than one minute.

There may be some implementations (6) of the above-described method (1) wherein the position referencing signal occasions in the first bundle are separated by no more than a number of slots in each position referencing signal occasion.

There may be some implementations (7) of the above-described method (1) wherein at least two of the position referencing signal occasions in the first bundle are consecutive.

There may be some implementations (8) of the above-described method (1) wherein all position referencing signal occasions in the first bundle are consecutive.

There may be some implementations (9) of the above-described method (1) wherein the position referencing signal occasions comprise non-narrowband signals.

There may be some implementations (10) of the above-described method (1) wherein the position referencing signal occasions comprise narrowband signals.

There may be some implementations (11) of the above-described method (1) wherein one or more position referencing signal occasions in the first bundle is muted.

There may be some implementations (12) of the above-described method (1) wherein the first bundle comprises less than 80 position referencing signal occasions.

There may be some implementations (13) of the above-described method (1) wherein the base station comprises an evolved Node B (eNodeB) or a New Radio (NR) Node B (gNB).

There may be some implementations (14) of the above-described method (1) further comprising: receiving a third bundle of a plurality of position sounding referencing signal occasions from the mobile device, wherein each position sounding referencing signal occasion comprises one or more slots; transmitting to an entity location information based on the plurality of position sounding referencing signal occasions from the third bundle for determining a first position estimate, wherein the entity comprises a location server or the mobile device; and receiving a fourth bundle of a plurality of position sounding referencing signal occasions from the mobile device, wherein the third bundle and the fourth bundle are separated in time by more slots than a number of slots in the third bundle and no position sounding referencing signal occasions are transmitted by the mobile device between the third bundle and the fourth bundle.

There may be some implementations (15) of the above-described method (14) wherein the third bundle of position sounding referencing signal occasions is received at the same time as the first bundle of the plurality of position sounding referencing signal occasions is transmitted.

There may be some implementations (16) of the above-described method (14) wherein the third bundle of position sounding referencing signal occasions and the first bundle of the plurality of position referencing signal occasions do not overlap in time.

There may be some implementations (17) of the above-described method (14) wherein the position of the mobile device is estimated using multi-cell Round Trip Time (RTT).

One implementation (18) may be a base station capable of transmitting bundled position referencing signal signals for supporting estimating a position of a mobile device, comprising: a wireless transceiver configured to wirelessly communicate with the mobile device; at least one memory; and at least one processor coupled to the wireless transceiver and the at least one memory, the at least one processor configured to: transmit a first bundle of position referencing signal occasions, wherein each position referencing signal occasion comprises one or more slots; transmit one or more slots of non-position referencing signal occasions; and transmit a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle.

There may be some implementations (19) of the above-described base station (18) wherein the non-position referencing signal occasions comprises data or other non-positioning information to be used by the mobile device.

There may be some implementations (20) of the above-described base station (18) the non-position referencing signal occasions between the first bundle and the second bundle comprises more slots than a number of slots in the first bundle.

There may be some implementations (21) of the above-described base station (18) wherein separation between the first bundle and the second bundle may be periodic.

There may be some implementations (22) of the above-described base station (18) wherein the separation between the first bundle and the second bundle may be greater than one minute.

There may be some implementations (23) of the above-described base station (18) wherein the position referencing signal occasions in the first bundle are separated by no more than a number of slots in each position referencing signal occasion.

There may be some implementations (24) of the above-described base station (18) wherein at least two of the position referencing signal occasions in the first bundle are consecutive.

There may be some implementations (25) of the above-described base station (18) wherein all position referencing signal occasions in the first bundle are consecutive.

There may be some implementations (26) of the above-described base station (18) wherein the position referencing signal occasions comprise non-narrowband signals.

There may be some implementations (27) of the above-described base station (18) wherein the position referencing signal occasions comprise narrowband signals.

There may be some implementations (28) of the above-described base station (18) wherein one or more position referencing signal occasions in the first bundle is muted.

There may be some implementations (29) of the above-described base station (18) wherein the first bundle comprises less than 80 position referencing signal occasions.

There may be some implementations (30) of the above-described base station (18) wherein the base station comprises an evolved Node B (eNodeB) or a New Radio (NR) Node B (gNB).

There may be some implementations (31) of the above-described base station (18) wherein the at least one processor is further configured to: receive a third bundle of a plurality of position sounding referencing signal occasions from the mobile device, wherein each position sounding referencing signal occasion comprises one or more slots; transmit to an entity via the wireless transceiver location information based on the plurality of position sounding referencing signal occasions from the third bundle for determining a first position estimate, wherein the entity comprises a location server or the mobile device; and receive a fourth bundle of a plurality of position sounding referencing signal occasions from the mobile device, wherein the third bundle and the fourth bundle are separated in time by more slots than a number of slots in the third bundle and no position sounding referencing signal occasions are transmitted by the mobile device between the third bundle and the fourth bundle.

There may be some implementations (32) of the above-described base station (31) wherein the third bundle of position sounding referencing signal occasions is received at the same time as the first bundle of the plurality of position sounding referencing signal occasions is transmitted.

There may be some implementations (33) of the above-described base station (31) wherein the third bundle of position sounding referencing signal occasions and the first bundle of the plurality of position referencing signal occasions do not overlap in time.

There may be some implementations (34) of the above-described base station (31) wherein the position of the mobile device is estimated using multi-cell Round Trip Time (RTT).

One implementation (35) may be a base station capable of transmitting bundled position referencing signal signals for supporting estimating a position of a mobile device, comprising: means for transmitting a first bundle of position referencing signal occasions, wherein each position referencing signal occasion comprises one or more slots; means for transmitting one or more slots of non-position referencing signal occasions; and means for transmitting a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle.

There may be some implementations (36) of the above-described base station (35) wherein the position referencing signal occasions in the first bundle are separated by no more than a number of slots in each position referencing signal occasion.

One implementation (37) may be a non-transitory computer readable medium including program code stored thereon, the program code is operable to configure at least one processor in a base station capable of transmitting bundled position referencing signal signals for supporting estimating a position of a mobile device, comprising: program code to transmit a first bundle of position referencing signal occasions, wherein each position referencing signal occasion comprises one or more slots; program code to transmit one or more slots of non-position referencing signal occasions; and program code to transmit a second bundle of position referencing signal occasions, wherein each position referencing signal occasion comprises one or more slots, wherein the one or more slots of non-position referencing signal occasions are transmitted between the first bundle and the second bundle and no position referencing signal occasions are transmitted between the first bundle and the second bundle.

There may be some implementations (38) of the above-described non-transitory computer readable medium of claim 37) wherein the position referencing signal occasions in the first bundle are separated by no more than a number of slots in each position referencing signal occasion.

One implementation (39) may be a method supporting estimating a position of a mobile device performed by a base station, comprising: receiving a first bundle of a plurality of position sounding referencing signal occasions from the mobile device, wherein each position sounding referencing signal occasion comprises one or more slots; transmitting to an entity location information based on the plurality of position sounding referencing signal occasions from the first bundle for determining a first position estimate, wherein the entity comprises a location server or the mobile device; and receiving a second bundle of a plurality of position sounding referencing signal occasions from the mobile device, wherein the first bundle and the second bundle are separated in time by more slots than a number of slots in the first bundle and no position sounding referencing signal occasions are transmitted by the mobile device between the first bundle and the second bundle.

There may be some implementations (40) of the above-described method (39) further comprising transmitting to the entity location information based on the position sounding referencing signal occasions of the second bundle for determining a second position estimate.

There may be some implementations (41) of the above-described method (39) wherein the position sounding referencing signal occasions in the first bundle are separated by no more than a number of slots in each position sounding referencing signal occasion.

There may be some implementations (42) of the above-described method (39) wherein at least two of the position sounding referencing signal occasions in the first bundle are consecutive.

There may be some implementations (43) of the above-described method (39) wherein all position sounding referencing signal occasions in the first bundle are consecutive.

There may be some implementations (44) of the above-described method (39) wherein the position sounding referencing signal occasions comprise non-narrowband signals.

There may be some implementations (45) of the above-described method (39) wherein the position sounding referencing signal occasions comprise narrowband signals.

There may be some implementations (46) of the above-described method (39) further comprising generating a plurality of positioning measurements based on the position sounding referencing signal occasions in the first bundle, wherein the location information based on the plurality of position sounding referencing signal occasions from the first bundle comprises the plurality of positioning measurements.

There may be some implementations (47) of the above-described method (46) wherein the position of the mobile device is estimated using a positioning method comprising one of Uplink Time Difference of Arrival (UTDOA), Uplink Angle of Arrival (UL-AoA), or Uplink Relative Time of Arrival (UL-RTOA).

There may be some implementations (48) of the above-described method (39) further comprising: transmitting a third bundle of position referencing signal occasions, wherein each position referencing signal occasion comprises one or more slots; transmitting one or more slots of non-position referencing signal occasions; and transmitting a fourth bundle of position referencing signal occasions, wherein each position referencing signal occasion comprises one or more slots, wherein the one or more slots of non-position referencing signal occasions are transmitted between the third bundle and the fourth bundle and no position referencing signal occasions are transmitted between the third bundle and the fourth bundle.

There may be some implementations (49) of the above-described method (48) wherein the third bundle of position referencing signal occasions is transmitted at the same time as the first bundle of the plurality of position sounding referencing signal occasions is received from the mobile device.

There may be some implementations (50) of the above-described method (48) wherein the third bundle of position referencing signal occasions and the first bundle of the plurality of position sounding referencing signal occasions do not overlap in time.

There may be some implementations (51) of the above-described method (48) wherein the position of the mobile device is estimated using multi-cell Round Trip Time (RTT).

There may be some implementations (52) of the above-described method (39) wherein one or more position sounding referencing signal occasions in the first bundle is muted.

There may be some implementations (53) of the above-described method (39) wherein the first bundle comprises less than 80 position sounding referencing signal occasions.

There may be some implementations (54) of the above-described method (39) wherein the base station comprises an evolved Node B (eNodeB) or a New Radio (NR) Node B (gNB).

One implementation (55) may be a method of transmitting bundled position sounding referencing signal signals by a mobile device for supporting estimating a position of the mobile device, comprising: transmitting a first bundle of position sounding referencing signal occasions, wherein each position sounding referencing signal occasion comprises one or more slots; delaying transmission of position sounding referencing signal occasions; and transmitting a second bundle of position sounding referencing signal occasions, wherein each position sounding referencing signal occasion comprises one or more slots, wherein delaying the transmission of position sounding referencing signal occasions is performed between transmission of the first bundle and the second bundle and no position sounding referencing signal occasions are transmitted between the first bundle and the second bundle.

There may be some implementations (56) of the above-described method (55) wherein delaying the transmission of position sounding referencing signal occasions comprises transmitting one or more slots of non-position sounding referencing signal occasions or entering idle mode, wherein the non-position sounding referencing signal occasions comprises data or other non-positioning information from the mobile device.

There may be some implementations (57) of the above-described method (56) the non-position sounding referencing signal occasions between the first bundle and the second bundle comprises more slots than a number of slots in the first bundle.

There may be some implementations (58) of the above-described method (55) wherein separation between the first bundle and the second bundle may be periodic.

There may be some implementations (59) of the above-described method (55) wherein the separation between the first bundle and the second bundle may be greater than one minute.

There may be some implementations (60) of the above-described method (55) wherein the position sounding referencing signal occasions in the first bundle are separated by no more than a number of slots in each position sounding referencing signal occasion.

There may be some implementations (61) of the above-described method (55) wherein at least two of the position sounding referencing signal occasions in the first bundle are consecutive.

There may be some implementations (62) of the above-described method (55) wherein all position sounding referencing signal occasions in the first bundle are consecutive.

There may be some implementations (63) of the above-described method (55) wherein the position sounding referencing signal occasions comprise non-narrowband signals.

There may be some implementations (64) of the above-described method (55) wherein the position sounding referencing signal occasions comprise narrowband signals.

There may be some implementations (65) of the above-described method (55) wherein one or more position sounding referencing signal occasions in the first bundle is muted.

There may be some implementations (66) of the above-described method (55) wherein the first bundle comprises less than 80 position sounding referencing signal occasions.

There may be some implementations (67) of the above-described method (55) wherein the mobile device is a narrowband Internet-of-Things (IoT) mobile device.

There may be some implementations (68) of the above-described method (55) further comprising: receiving a third bundle of a plurality of position referencing signal occasions from one or more base stations, wherein each position referencing signal occasion comprises one or more slots; transmitting to a location server location information based on the plurality of position referencing signal occasions from the third bundle for determining a first position estimate; and receiving a fourth bundle of a plurality of position referencing signal occasions from the one or more base stations, wherein the third bundle and the fourth bundle are separated in time by more slots than a number of slots in the third bundle and no position referencing signal occasions are transmitted by the one or more base stations between the third bundle and the fourth bundle.

There may be some implementations (69) of the above-described method (68) wherein the third bundle of position referencing signal occasions is received from the one or more base stations at the same time as the first bundle of the plurality of position sounding referencing signal occasions is transmitted.

There may be some implementations (70) of the above-described method (68) wherein the third bundle of position referencing signal occasions and the first bundle of the plurality of position sounding referencing signal occasions do not overlap in time.

There may be some implementations (71) of the above-described method (68) wherein the position of the mobile device is estimated using multi-cell Round Trip Time (RTT).

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to the foregoing description.

What is claimed is:

1. A method of supporting estimating a position of a mobile device performed by the mobile device, comprising:

receiving a first bundle of a plurality of position referencing signal occasions from a base station, wherein each position referencing signal occasion comprises one or more slots;

determining positioning measurements based on the plurality of position referencing signal occasions from the first bundle for determining a first position estimate; and receiving a second bundle of a plurality of position referencing signal occasions from the base station, wherein the first bundle and the second bundle are bundles of the plurality of position referencing signal occasions that are received from the base station with a periodicity that is greater than 12 seconds and are separated in time by more slots than a number of slots in the first bundle and no position referencing signal occasions are transmitted by the base station between the first bundle and the second bundle.

2. The method of claim 1, wherein determining the positioning measurements comprises determining the first position estimate based on the plurality of position referencing signal occasions from the first bundle by the mobile device or determining the position measurements and transmitting the positioning measurements to a location server for determining the first position estimate.

3. The method of claim 2, further comprising determining positioning measurements based on the position referencing signal occasions of the second bundle for determining a second position estimate.

4. The method of claim 1, wherein the position referencing signal occasions in the first bundle are separated by no more than a number of slots in each position referencing signal occasion.

5. The method of claim 1, wherein at least two of the position referencing signal occasions in the first bundle are consecutive.

6. The method of claim 1, wherein all position referencing signal occasions in the first bundle are consecutive.

7. The method of claim 1, wherein the position referencing signal occasions comprise non-narrowband signals.

8. The method of claim 1, wherein the position referencing signal occasions comprise narrowband signals.

9. The method of claim 1, further comprising generating a plurality of positioning measurements based on the position referencing signal occasions in the first bundle.

10. The method of claim 9, wherein the position of the mobile device is estimated using a positioning method comprising one of Observed Time Difference of Arrival (OTDOA), Downlink Time Difference of Arrival (DL-TDOA), Downlink Angle of Departure (DL AoD), or Enhanced Cell ID (ECID).

11. The method of claim 1, further comprising:
generating a plurality of positioning measurements based on the position referencing signal occasions in the first bundle, and
generating a position estimate of the mobile device using the plurality of positioning measurements.

12. The method of claim 1, wherein one or more position referencing signal occasions in the first bundle is muted.

13. The method of claim 1, wherein the first bundle comprises less than 80 position referencing signal occasions.

14. The method of claim 1, wherein the mobile device is a narrowband Internet-of-Things (IoT) mobile device.

15. The method of claim 1, further comprising:
transmitting a third bundle of position sounding referencing signal occasions, wherein each position sounding referencing signal occasion comprises one or more slots;
delaying transmission of position sounding referencing signal occasions; and
transmitting a fourth bundle of position sounding referencing signal occasions, wherein each position sounding referencing signal occasion comprises one or more slots, wherein delaying the transmission of position sounding referencing signal occasions is performed between transmission of the third bundle and the fourth bundle and no position sounding referencing signal occasions are transmitted between the third bundle and the fourth bundle.

16. The method of claim 15, wherein the third bundle of position sounding referencing signal occasions is transmitted at the same time as the first bundle of the plurality of position referencing signal occasions is received from the base station.

17. The method of claim 15, wherein the third bundle of position sounding referencing signal occasions and the first bundle of the plurality of position referencing signal occasions do not overlap in time.

18. The method of claim 15, wherein the position of the mobile device is estimated using multi-cell Round Trip Time (RTT).

19. A mobile device capable of supporting estimating a position of the mobile device, comprising:
a wireless transceiver configured to wirelessly communicate with a wireless network and to receive signals transmitted from base station;
at least one memory; and
at least one processor coupled to the wireless transceiver and the at least one memory, the at least one processor configured to:
receive a first bundle of a plurality of position referencing signals occasions via the wireless transceiver from the base station, wherein each position referencing signal occasion comprises one or more slots;
determine positioning measurements based on the plurality of position referencing signal occasions from the first bundle for determining a first position estimate; and
receive a second bundle of a plurality of position referencing signal occasions from the base station, wherein the first bundle and the second bundle are bundles of the plurality of position referencing signal occasions that are received from the base station with a periodicity that is greater than 12 seconds and are separated in time by more slots than a number of slots in the first bundle and no position referencing signal occasions are transmitted by the base station between the first bundle and the second bundle.

20. The mobile device of claim 19, wherein the at least one processor is configured to determine the positioning measurements by being configured to determine the first position estimate based on the plurality of position referencing signal occasions from the first bundle or determining the position measurements and transmit the positioning measurements to a location server via the wireless transceiver for determining the first position estimate.

21. The mobile device of claim 20, the at least one processor being further configured to determine positioning measurements based on the position referencing signal occasions of the second bundle for determining a second position estimate.

22. The mobile device of claim 19, wherein the position referencing signal occasions in the first bundle are separated by no more than a number of slots in each position referencing signal occasion.

23. The mobile device of claim 19, wherein at least two of the position referencing signal occasions in the first bundle are consecutive.

24. The mobile device of claim 19, wherein all position referencing signal occasions in the first bundle are consecutive.

25. The mobile device of claim 19, wherein the position referencing signal occasions comprise non-narrowband signals.

26. The mobile device of claim 19, wherein the position referencing signal occasions comprise narrowband signals.

27. The mobile device of claim 19, wherein the at least one processor is further configured to generate a plurality of positioning measurements based on the position referencing signal occasions in the first bundle.

28. The mobile device of claim 27, wherein the position of the mobile device is estimated using a positioning method comprising one of Observed Time Difference of Arrival (OTDOA), Downlink Time Difference of Arrival (DL-TDOA), Downlink Angle of Departure (DL AoD), or Enhanced Cell ID (ECID).

29. The mobile device of claim 19, wherein the at least one processor is further configured to:
generate a plurality of positioning measurements based on the position referencing signal occasions, and
generate a position estimate of the mobile device using the plurality of positioning measurements.

30. The mobile device of claim 19, wherein one or more position referencing signal occasions in the first bundle is muted.

31. The mobile device of claim 19, wherein the first bundle comprises less than 80 position referencing signal occasions.

32. The mobile device of claim 19, wherein the mobile device is a narrowband Internet-of-Things (IoT) mobile device.

33. The mobile device of claim 19, wherein the at least one processor is further configured to:
transmit a third bundle of position sounding referencing signal occasions, wherein each position sounding referencing signal occasion comprises one or more slots;
delay transmission of position sounding referencing signal occasions; and
transmit a fourth bundle of position sounding referencing signal occasions, wherein each position sounding referencing signal occasion comprises one or more slots, wherein the delay of the transmission of position sounding referencing signal occasions is performed between transmission of the third bundle and the fourth bundle and no position sounding referencing signal occasions are transmitted between the third bundle and the fourth bundle.

34. The mobile device of claim 33, wherein the third bundle of position sounding referencing signal occasions is transmitted at the same time as the first bundle of the plurality of position referencing signal occasions is received from the base station.

35. The mobile device of claim 33, wherein the third bundle of position sounding referencing signal occasions and the first bundle of the plurality of position referencing signal occasions do not overlap in time.

36. The mobile device of claim 33, wherein the position of the mobile device is estimated using multi-cell Round Trip Time (RTT).

37. A mobile device capable of supporting estimating a position of the mobile device, comprising:
   means for receiving a first bundle of a plurality of position referencing signal occasions from base station, wherein each position referencing signal occasion comprises one or more slots;
   means for determining positioning measurements based on the plurality of position referencing signal occasions from the first bundle for determining a first position estimate; and
   means for receiving a second bundle of a plurality of position referencing signal occasions from the base station, wherein the first bundle and the second bundle are bundles of the plurality of position referencing signal occasions that are received from the base station with a periodicity that is greater than 12 seconds and are separated in time by more slots than a number of slots in the first bundle and no position referencing signal occasions are transmitted by the base station between the first bundle and the second bundle.

38. The mobile device of claim 37, further comprising means for determining positioning measurements based on the position referencing signal occasions of the second bundle for determining a second position estimate.

39. A non-transitory computer readable medium including program code stored thereon, the program code is operable to configure at least one processor in a mobile device capable of supporting estimating a position of the mobile device, comprising:
   program code to receive a first bundle of a plurality of position referencing signal occasions from base station, wherein each position referencing signal occasion comprises one or more slots;
   program code to determine positioning measurements based on the plurality of position referencing signal occasions from the first bundle for determining a first position estimate; and
   program code to receive a second bundle of a plurality of position referencing signal occasions from the base station, wherein the first bundle and the second bundle are bundles of the plurality of position referencing signal occasions that are received from the base station with a periodicity that is greater than 12 seconds and are separated in time by more slots than a number of slots in the first bundle and no position referencing signal occasions are transmitted by the base station between the first bundle and the second bundle.

40. The non-transitory computer readable medium of claim 39, further comprising program code to determine positioning measurements based on the position referencing signal occasions of the second bundle for determining a second position estimate.

* * * * *